(12) United States Patent  (10) Patent No.: US 9,103,118 B2
Henderson  (45) Date of Patent: Aug. 11, 2015

(54) METHODS AND APPARATUS OF BUILDING CONSTRUCTION RESISTING EARTHQUAKE AND FLOOD DAMAGE

(71) Applicant: ARX PAX, LLC, Saratoga, CA (US)

(72) Inventor: D. Gregory Henderson, San Jose, CA (US)

(73) Assignee: Arx Pax LLC, Saratoga, CA (US)

( * ) Notice: Subject to any disclaimer, the term of this patent is extended or adjusted under 35 U.S.C. 154(b) by 0 days.

(21) Appl. No.: 14/320,327

(22) Filed: Jun. 30, 2014

(65) Prior Publication Data

US 2014/0311060 A1   Oct. 23, 2014

Related U.S. Application Data

(63) Continuation of application No. 13/843,914, filed on Mar. 15, 2013, now Pat. No. 8,777,519.

(51) Int. Cl.
*E02D 27/34* (2006.01)
*E04H 9/02* (2006.01)
*E04B 1/98* (2006.01)
*E04H 9/14* (2006.01)

(52) U.S. Cl.
CPC ............... *E04B 1/985* (2013.01); *E02D 27/34* (2013.01); *E04H 9/021* (2013.01); *E04H 9/145* (2013.01)

(58) Field of Classification Search
CPC ............ E02D 27/34; E04H 9/02; E04H 9/021
USPC ........................ 405/195.1, 196, 200, 219, 229; 52/167.1, 167.4
See application file for complete search history.

(56) References Cited

U.S. PATENT DOCUMENTS

| 385,821 | A | | 7/1888 | Myers | |
|---|---|---|---|---|---|
| 2,715,756 | A | | 8/1955 | Carver | |
| 3,232,015 | A | * | 2/1966 | Latham | 52/167.4 |
| 3,626,702 | A | * | 12/1971 | Monohan | 405/229 |
| 3,748,800 | A | * | 7/1973 | Glicksberg | 52/167.4 |
| 3,986,367 | A | * | 10/1976 | Kalpins | 405/225 |

(Continued)

FOREIGN PATENT DOCUMENTS

| DE | 19543195 A1 | 5/1997 |
|---|---|---|
| DE | 29904806 | 1/2000 |

(Continued)

OTHER PUBLICATIONS

"U.S. Appl. No. 13/843,914, Examiner Interview Summary mailed Nov. 18, 2013", 5 pgs.

(Continued)

*Primary Examiner* — Frederick L Lagman
(74) *Attorney, Agent, or Firm* — Kwan & Olynick LLP

(57) ABSTRACT

A three part foundation system for supporting a building is described. Three part foundation systems can include a containment vessel, which constrains a buffer medium to an area above the containment vessel, and a construction platform. A building can be built on the construction platform. In a particular embodiment, during operation, the construction platform and structures built on the construction platform can float on the buffer medium. In an earthquake, a construction platform floating on a buffer medium may experience greatly reduced shear forces. In a flood, a construction platform floating on a buffer medium can be configured to rise as water levels rise to limit flood damage.

19 Claims, 18 Drawing Sheets

(56) References Cited

U.S. PATENT DOCUMENTS

| | | | |
|---|---|---|---|
| 4,548,153 | A | 10/1985 | Watchorn |
| 5,495,221 | A | 2/1996 | Post |
| 5,647,693 | A | 7/1997 | Carlinsky et al. |
| 5,705,902 | A | 1/1998 | Merritt et al. |
| 5,722,326 | A | 3/1998 | Post |
| 5,775,847 | A | 7/1998 | Carlinsky et al. |
| 5,847,480 | A | 12/1998 | Post |
| 5,904,446 | A | 5/1999 | Carlinsky et al. |
| 6,191,515 | B1 | 2/2001 | Post |
| 6,347,487 | B1 | 2/2002 | Davis |
| 6,503,318 | B2 | 1/2003 | Pye et al. |
| 6,564,882 | B2 | 5/2003 | Durmeyer et al. |
| 6,629,503 | B2 | 10/2003 | Post |
| 6,657,344 | B2 | 12/2003 | Post |
| 6,792,335 | B2 | 9/2004 | Ross |
| 7,607,864 | B2 | 10/2009 | Kenady |
| 8,009,001 | B1 | 8/2011 | Cleveland |
| 8,011,159 | B1 | 9/2011 | Saebi |
| 8,066,451 | B2 | 11/2011 | Ewers et al. |
| 8,262,321 | B1 | 9/2012 | Saebi |
| 8,264,314 | B2 | 9/2012 | Sankar |
| 8,294,316 | B2 | 10/2012 | Blackwelder et al. |
| 8,777,519 | B1 | 7/2014 | Henderson |
| 2004/0261338 | A1 | 12/2004 | De Cherance |
| 2006/0026910 | A1* | 2/2006 | Davar ........................... 52/167.1 |
| 2007/0163483 | A1 | 7/2007 | Chelaru |
| 2007/0166110 | A1 | 7/2007 | Kenady |
| 2009/0113812 | A1* | 5/2009 | Lino ........................... 52/169.9 |
| 2009/0324341 | A1 | 12/2009 | Grinberg et al. |
| 2011/0123275 | A1 | 5/2011 | Nelson |

FOREIGN PATENT DOCUMENTS

| | | |
|---|---|---|
| EP | 0008567 | 3/1980 |
| JP | 61200220 | 9/1986 |
| JP | 09151623 | 6/1997 |
| JP | 2001140499 | 5/2001 |
| JP | 200770982 | 3/2007 |
| JP | 200777758 | 3/2007 |
| JP | 2007211445 | 8/2007 |
| KR | 2007028791 | 3/2007 |

OTHER PUBLICATIONS

"U.S. Appl. No. 13/843,914, Final Office Action mailed Jan. 15, 2014", 6 pgs.

"U.S. Appl. No. 13/843,914, Non Final Office Action mailed Aug. 26, 2013", 8 pgs.

"U.S. Appl. No. 13/843,914, Notice of Allowance mailed Mar. 10, 2014", 5 pgs.

"Development and Practical Application of a Seismic-Isolation Structural System Based on Buoyancy", Partially Floating Structural System, Shimizu Corporation, 6.

"Water Supply and Wastewater Disposal Manual", U.S. Department of Transportation/United States Coast Guard Commandant Instructions M6240.5, Oct. 10, 1999, 1-161.

"XYPEX ADMIX C-2000 Product Data", Concrete Waterproofing by Crystallization™, 10/009, 4.

* cited by examiner

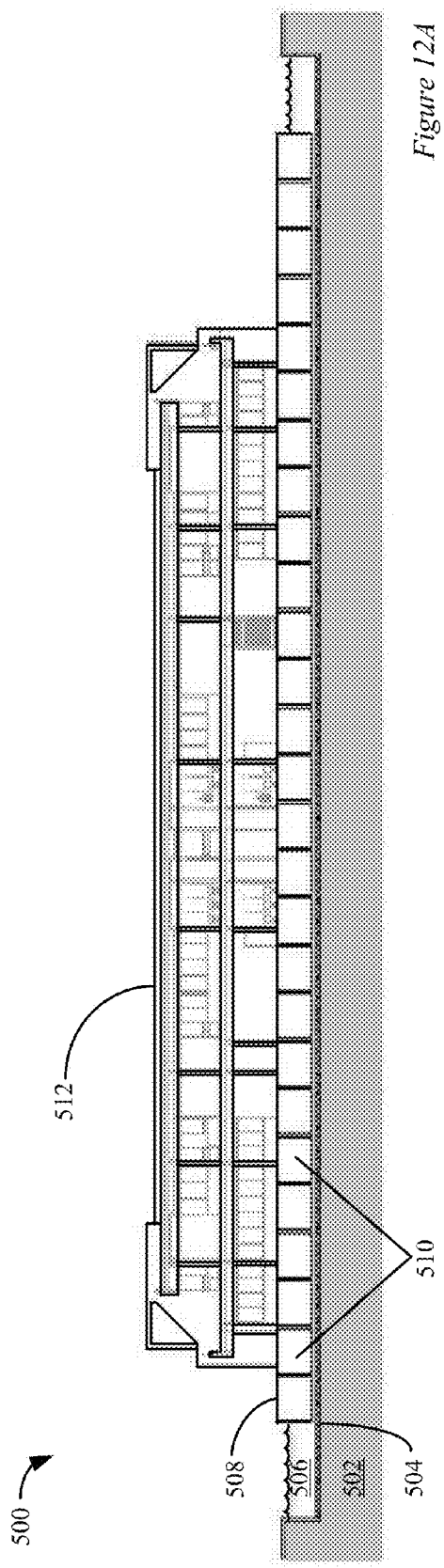
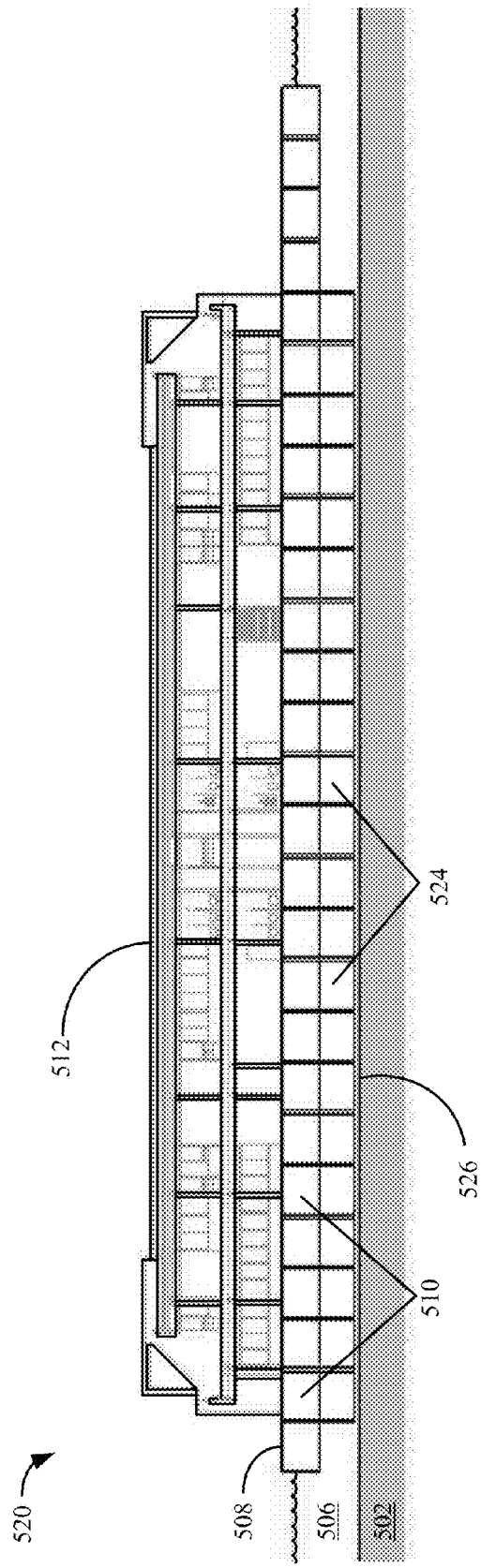

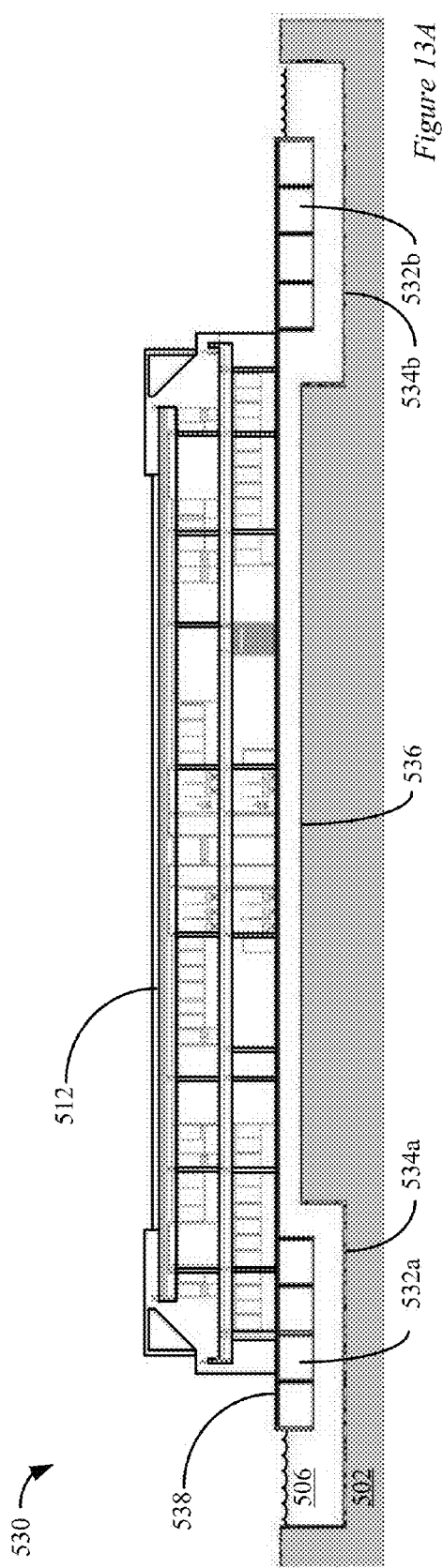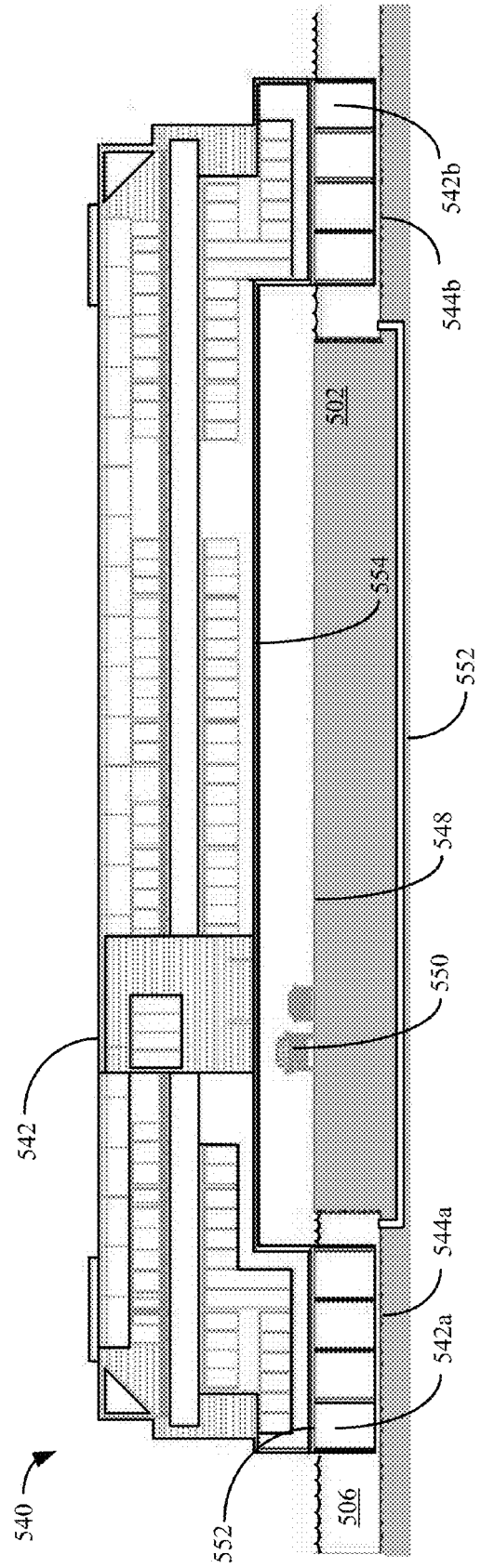

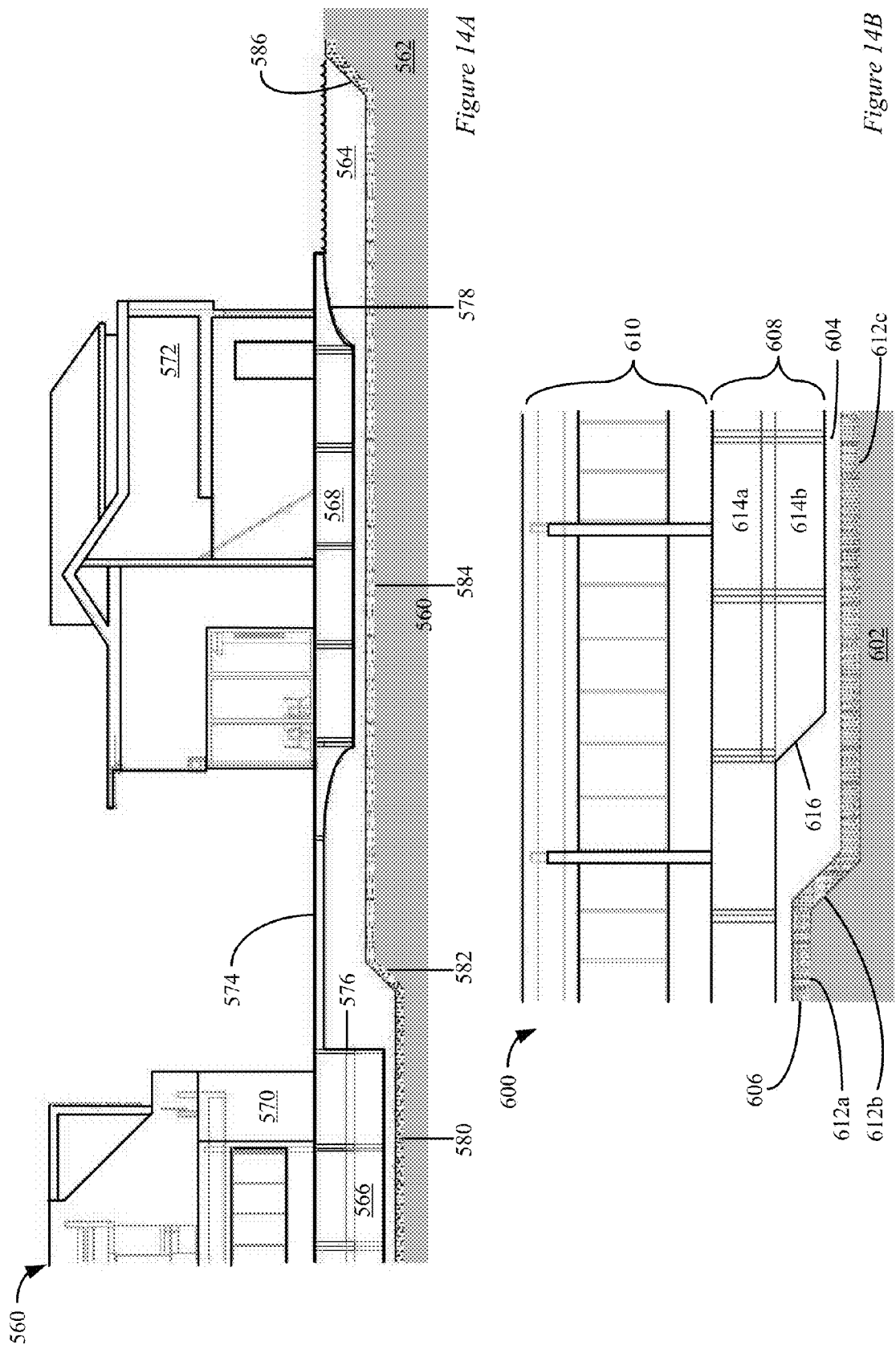

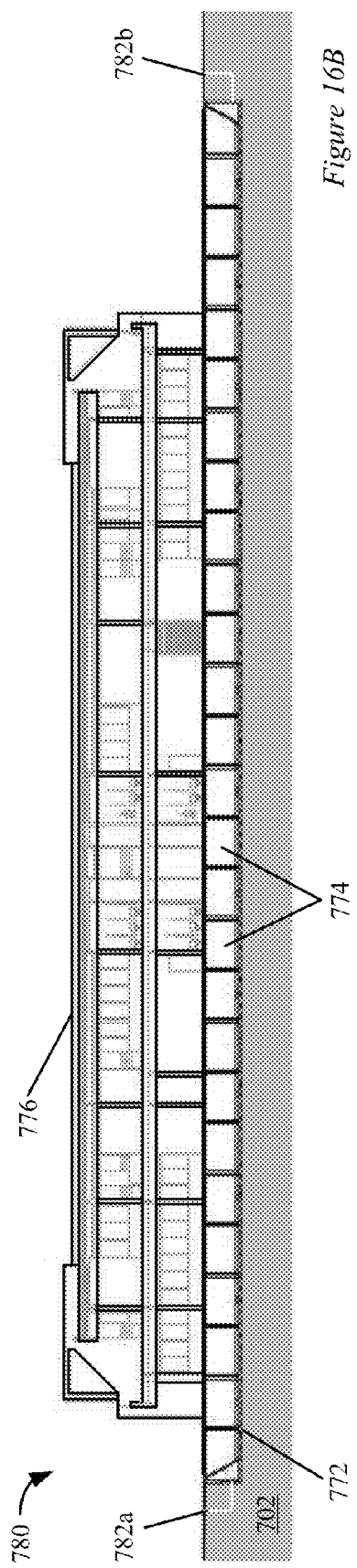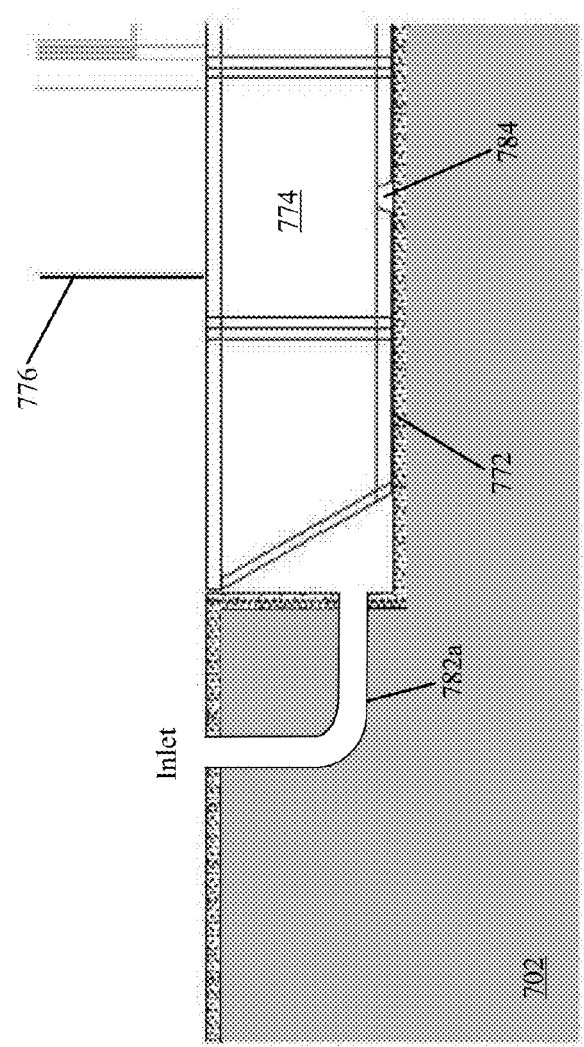
Figure 16B
Figure 16C

METHODS AND APPARATUS OF BUILDING CONSTRUCTION RESISTING EARTHQUAKE AND FLOOD DAMAGE

CROSS REFERENCE TO RELATED APPLICATIONS

This patent application claims priority under 35 U.S.C. §120 and is a continuation of U.S. patent application Ser. No. 13/843,914, filed Mar. 15, 2013, issued as U.S. Pat. No. 8,777,519, by Henderson, which is incorporated by reference in its entirety and for all purposes.

FIELD OF THE INVENTION

This invention generally relates to building construction methods, and more particularly to building construction methods for mitigating seismic, flood and tsunami damage.

BACKGROUND

It is estimated that over the last hundred years damage from earthquakes has averaged from 2-4 billion a year in the United States. Damage from floods annually yearly costs a similar amount in the United States. Earthquake events tend to happen less frequently than flood events. However, the damage costs for any significant event tend to be quite large. Worldwide, the costs in lives and physical damage are much greater.

In the U.S., Earthquake risk is primarily focused on the West Coast. However, the new Madrid fault system where Illinois, Kentucky, Tennessee, Missouri and Arkansas come together along the upper Mississippi river also has the potential for generating a large earthquake. Flood damage can occur nearly anywhere in the U.S.

Away from coastal regions, flooding primarily is caused from overflowing of rivers and their associated tributaries. On the coasts, which have the highest population density (half of the US population lives within 50 miles of the coast), flooding is caused from overflowing rivers, storm surges and tidal surges. It is expected global warming and an associated rises in sea level and weather variability will only exacerbate coastal flooding and inland flooding issues. In addition, the West coast, Hawaii and Alaska face a significant flooding threat from Tsunamis and associated earthquakes. It is estimated the repair of the damage from recent earthquake and tsunami in Japan in 2011 will cost on the order of $300 billion dollars.

Cost effective methods for mitigating flood and earthquake damage are limited. For floods, one method is to determine flood prone regions and avoid building in these areas. Flood maps often affect the availability and pricing of land and insurance in the areas covered by the maps. Another method for flood mitigation is to raise the building. Essentially, a multi-story building is constructed where the lower level remains unused, which is inefficient. This method is sometimes applied to smaller buildings, such as houses, but is not generally applied to medium or larger sized buildings. Further, the construction is usually not sufficient to withstand powerful flood conditions.

Levees are used to control floods. However, levees are expensive to build and maintain, have a high-environmental impact, utilize a lot of land and, in areas with earthquake risks, are vulnerable to collapse in an earthquake. Further, as past experience has shown, levees are vulnerable to point failures where a breach at just one location can mitigate most of the benefits of building the levee in the first place.

For seismic activity, earthquake maps guide building practices and in some instances may identify areas subject to soil liquefaction which are unsuitable for building. To mitigate seismic damage, larger buildings, such as skyscrapers, sometimes use base isolation and/or vibration dampening systems to mitigate earthquake damage. Medium and smaller size building use building techniques and/or are retrofitted with strengthening mechanisms which prevent catastrophic failure and subsequent loss of life but still subject the building to significant damage in an earthquake. Base isolation is generally not considered cost effective for medium and smaller size building and is rarely applied.

In view of the above, improved and cost-effective methods and apparatus for constructing buildings which mitigate seismic and flood damage are needed.

SUMMARY

A three part foundation system for supporting a building is described. Three part foundation systems can include a containment vessel, a buffer medium and a construction platform. The construction platform rests on the buffer medium which rests on the containment vessel. A building can be built on the construction platform. The buffer medium can be a fluid, a gas or a liquefiable solid. In the case of a fluid buffer medium, such as water, the construction platform can be designed with a sufficiently low density such that the construction platform and building float on top of the buffer medium where the containment vessel constrains the buffer medium to at least an area between the containment vessel and the construction platform.

In an earthquake, the containment vessel can experience seismic forces, such as large lateral forces, which are minimally transferred through the buffer medium to the construction platform and any buildings residing on the construction platform because of the buffer medium's limited transmission of seismic forces. Thus, a relatively simple and cost effective base isolation system is achieved. In a flood, as a long as the construction platform and the associated buildings are sufficiently buoyant in water, the construction platform and building can rise with the rising water level. Thus, the design of the TPFS can mitigate both earthquake and flood damage in regions subjects to both floods and earthquakes or just flood damage in regions only subject to floods.

A method of construction a three part foundation system for a building is described. The method can be generally characterized as a) forming a containment vessel for holding a buffer medium on a ground; b) filling the containment vessel with the buffer medium; c) testing whether the containment vessel holds the buffer medium; d) draining the buffer medium from the containment vessel; e) forming a construction platform above the containment vessel wherein the construction platform including the building is configured to float on the buffer medium when the buffer medium is added to the containment vessel; f) adding the buffer medium to the containment vessel to allow the construction platform and the building to float on the buffer medium; and g) positioning the construction platform relative to sides of the containment vessel such that during an earthquake the containment vessel can move from side to side while the construction platform floats above it allowing seismic forces transferred from the ground to the construction platform to be minimized. In one embodiment, the construction platform can be assembled from pre-fabricated units and it may not be necessary to perform the draining step d in the above method.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

FIGS. 12A and 12B are section views including examples of construction platforms in a three part foundation system having different buoyancy configurations in accordance with the described embodiments.

FIGS. 13A and 13B are further examples of construction platforms in a three part foundation system having different buoyancy configurations in accordance with the described embodiments.

FIG. 14A is a section view of a three part foundation system having linked multiple construction platforms and a single containment vessel with multiple levels in accordance with the described embodiments.

FIG. 14B is a section view with a detail of a three part foundation system including a construction platform and a containment vessel with multiple levels in accordance with the described embodiments.

FIGS. 16A, 16B and 16C are section views of three part foundation system configured for mitigating flood damage in accordance with the described embodiments.

DESCRIPTION OF THE PREFERRED EMBODIMENTS

Figure 1A:
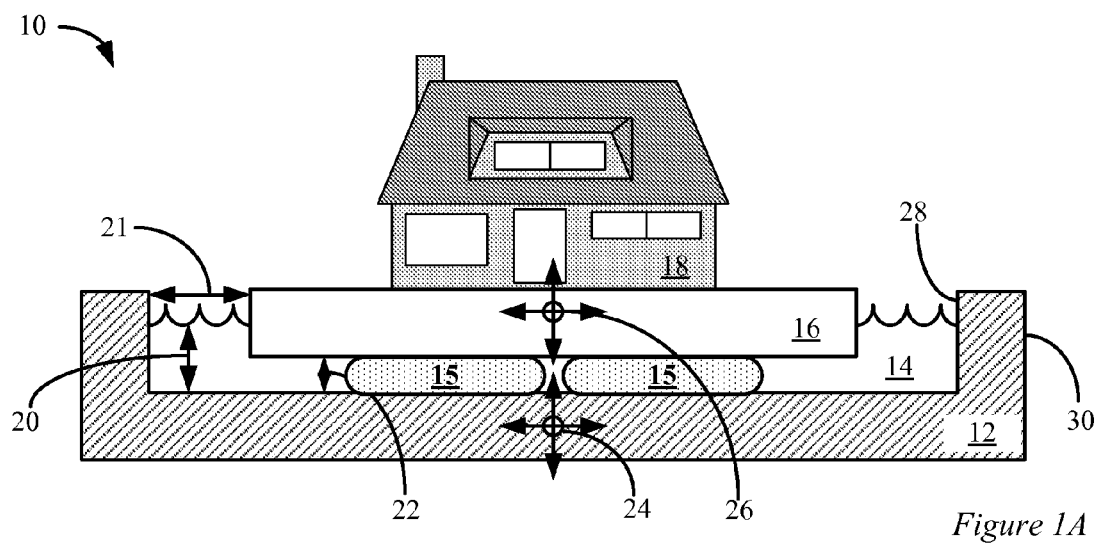
FIGS. 1A and 1B are block diagrams of a building constructed on a three part foundation system in accordance with the described embodiments.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As described as follows, construction methods and apparatus are described for mitigating building and infrastructure damage during earthquake and flooding events. In particular, apparatus and method for constructing a three part foundation system (TPFS) are described. The TPFS includes a containment vessel, a buffer medium and a construction platform. A building, bridges, roads and/or other structures can be constructed over and coupled to the construction platform.

The buffer medium can be a gas, liquid or a solid. In the case of a liquid buffer medium, such as water, the containment vessel can be configured to hold or constrain the buffer medium to a region above the containment vessel. In one embodiment, the containment vessel can be integrated into the ground on a plot of land and formed from a building material such as concrete. Then, the containment vessel can be "filled" with the buffer medium.

In operation, the construction platform rests on the buffer medium. In the case of a liquid buffer medium, the construction platform can be designed to displace enough of the buffer medium such that the platform and any building constructed on the platform "float" on the buffer medium. The buffer medium can be selected such that seismic forces, and in particular lateral forces which are known to be most damaging to building an earthquake, are not greatly transmitted through the medium. Water is one an example of a potential buffer medium that has this property.

In an earthquake, the containment vessel can experience large lateral forces which are minimally transferred through the buffer medium to the construction platform and any buildings residing on the construction platform because of the buffer medium's limited transmission of the seismic forces. Thus, a relatively simple and cost effective base isolation system is achieved. The approach is particularly suitable to small and medium sized building where traditional base isolation systems are too costly to apply. It is also can be scaled to accommodate larger buildings.

In a flood, as a long as the construction platform and the associated buildings are sufficiently buoyant in water, the construction platform and building can rise with the rising water level. If desired, tethering mechanism can be provided which prevent the construction platform and building from floating away from the containment vessel. Thus, the design of the TPFS can mitigate both earthquake and flood damage in regions subjects to both floods and earthquakes or just flood damage in regions only subject to floods.

The TPFS approach is scalable to allow its use on groups of structures including buildings and structures of different sizes spread out over a large area. It is suitable for use on essential structures which need to remain operative during and after earthquakes or floods, such as hospitals and other buildings needed to coordinate an emergency response. In addition, it may be suitable for use in areas subject to soil liquefaction during an earthquake or areas located in a flood plain. This feature may allow for land development in areas previously deemed unsuitable for development.

Details of the TPFS are described with respect to the following FIGS. 1A-16C. In particular, under different operational modes, examples of a TPFS, forces to which a TPFS is exposed and mechanisms for dealing with these forces are described. With respect to FIGS. 6A, 6B, 7A, 7B, 8A, 8B and 8C different methods and apparatus for forming a construction platform in the TPFS are described. With respect to FIG. 9, methods and apparatus for building a TPFS are discussed.

In the description of FIGS. 10A-16C, different features of the TPFS are illustrated. For example, with respect to FIGS. 10A, 10B, 11A and 11B some example shapes for the containment vessel and construction platform and interactions between the construction platform and the containment vessel via the buffer medium are described. With respect to FIGS. 12A, 12B, 13A, 13B and 15A-15C, the distribution of buoyant forces resulting from different construction platform designs are discussed. With respect to FIGS. 14A and 14B, TPFS designs including multiple linked platforms and a containment vessel with multiple levels are described. Finally, with respect to FIGS. 16A, 16B and 16C, a TPFS configured to only utilize a buffer medium in limited operational modes is described.

Three Part Foundation System Overview

Figure 1B:
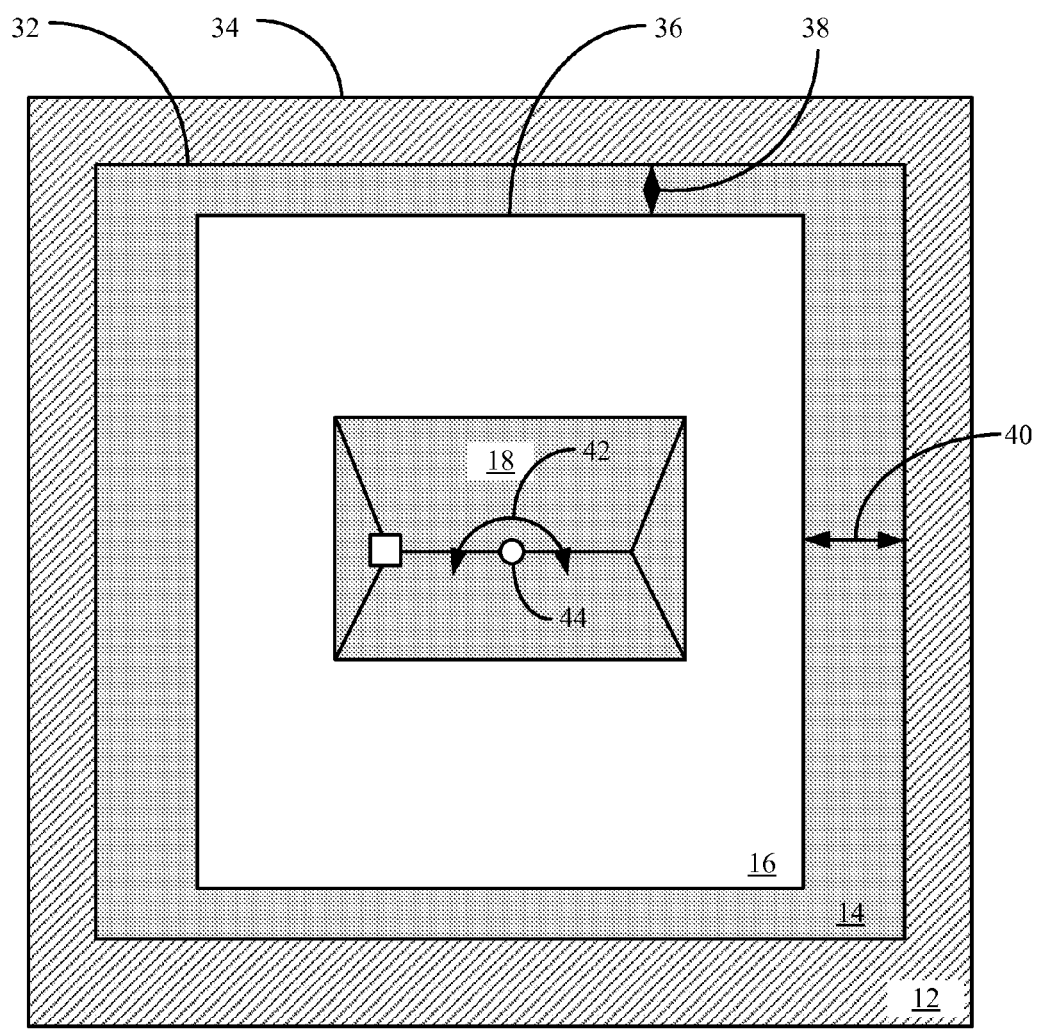

FIGS. 1A and 1B are block diagrams of a system 10 including a building 18 constructed on a three part foundation system (TPFS). A section view of the system 10 is shown in FIG. 1A. The TPFS includes a containment vessel 12, a buffer medium 20 held within the containment vessel and a construction platform 16, having a residential building, on top of the buffer medium 20.

In particular embodiments, the buffer medium can be a liquid, such as water. In the case of water, additives can be mixed with the water to change the buoyancy properties. For example, salt can be added to the water to increase its density and the hence increase the buoyancy force. The water can also be used for secondary purposes, such as fire suppression, drinking water storage or grey water storage.

The buffer medium can be enclosed in some manner (see e.g., see FIG. 11A) or can be exposed to outdoor conditions. In one embodiment, a gas, such as air enclosed in a bladder structure of some type can be used, as a buffer medium for supporting the weight of the building. In yet another embodiment, described in more detail with respect to FIG. 16A, a building can be magnetically levitated to create a gap between the containment vessel 12 and the construction platform 16. In this example, a gas, such as air, or a liquid, such as water, can be used as the buffer medium within the gap.

The construction platform 16 can be formed to displace enough of the buffer medium float on the buffer medium. As a rule of thumb for an incompressible fluid as the buffer medium (e.g., water), to achieve flotation, the weight of the buffer medium displaced is greater than the weight of the construction platform and any additional weight placed on top of the platform. In general, when the construction platform 16 including any other objects placed on the platform, such as building 18, is floating, buoyant forces exerted on the platform are greater than the weight of the construction and all of the objects placed on the platform. It is estimated using some of the construction practices described as follows, a three story building can be floated in as little as three feet of water.

Buoyancy is an upward force exerted by a fluid, which opposes the weight of an immersed object. In a column of fluid, pressure increases with depth as a result of the weight of the overlying fluid. Thus a column of fluid, or an object submerged in the fluid, experiences greater pressure at the bottom of the column than at the top. This difference in pressure results in a net force that tends to accelerate an object upwards. The magnitude of that force is proportional to the difference in the pressure between the top and the bottom of the column, and is also equivalent to the weight of the fluid that would otherwise occupy the column, i.e. the displaced fluid.

In FIG. 1A, the containment vessel 12 is a flat bottomed structure with vertical sides. The vessel 12 includes an inner surface 28 and an outer surface 30. The distance between the inner surface 28 and outer surface, i.e., the thickness of vessel 12 is relatively constant. The shape of the containment vessel 12 is shown is for illustrative purposes only. In general, any shape which allows containment of a buffer medium is suitable. For example, the bottom of the vessel can be curved or stepped, such that the height/depth 20 of the buffer medium varies across the vessel. The side wall can be slanted, stepped or curved where the height of the side wall can vary. Further, the shape of the outer surface 30 can be different than the shape of the inner surface so that the thickness of containment vessel varies.

In operation, the containment vessel 24 and the construction platform can experience different loads, such as vertical and horizontal, which are distributed and can vary across their respective surfaces. For example, forces on the containment vessel 12 can be exerted from the material surrounding it, such as soil or water permeating the soil, and a pressure of the buffer medium contained within it. Forces on the construction platform 16 can be the pressure exerted on it by the buffer medium beneath it, the weight of the objects on it and the pressure exerted on the platform resulting from other environment forces, such as the wind.

The loads placed on the containment vessel and the construction platform can be relatively static or can be dynamic loads. For example, a heavy truck driving across the construction platform can introduce a dynamic load (see e.g., FIG. 2A). As another example, during an earthquake, a seismic wave passing through the containment vessel can introduce a dynamic load. In FIG. 1A, horizontal and vertical forces, whose direction and magnitude can change, are shown at a first point 24 within the containment vessel 12 and a second point within the construction platform 24.

As described above, during an earthquake, the design of the TPFS can mitigate damage which is transmitted to the construction platform 16 and the building 18. In particular, when a buffer medium is used that transfers very little of the shear forces, the containment vessel 16 can move laterally underneath the construction platform 16 while the construction platform remains relatively still. Thus, the damage to the construction platform 16 and building 18 from the shear component of the seismic wave, often referred to as the S wave, are mitigated. The upward or thrust portion of the wave can cause the building to bob up and down like a cork on the water. Thus, the damage to the construction platform 16 and building form the upward movement of the seismic wave, often referred to as the P wave, are reduced. For most earthquakes, the S wave is considered the most destructive component of the seismic waves for structures.

In FIG. 1A, a vertical spacing 22 is shown between the bottom of the construction platform 16 and the containment vessel 12 and a horizontal spacing 21 is shown between an outside of the construction platform 16 and an inside of the containment vessel 12. In one embodiment, the horizontal spacing 21 can be selected such that the construction platform 16 doesn't contact the sides of the containment vessel 12 or contact is minimal during an earthquake. The vertical spacing 22 can be selected such the construction platform 16 doesn't bang against the inner bottom of the containment vessel. Thus, based upon, an earthquake shaking profile, which is selected for design purposes, a minimum spacing distribution can be determined between the construction platform 16 and the containment vessel 12.

In FIG. 1B, a top view of the containment vessel 12 and construction platform 16 from FIG. 1A is shown. The construction platform 16 and containment vessel 12 are rectangular shaped. Spacing 38 and 40 between an outer perimeter of the construction platform 16 and the inner perimeter 32 of the containment vessel 12 can vary, as is shown in FIG. 1B. As described above, it may be desirable to maintain a minimum spacing between the sides of the platform 16 and vessel 12. However, spacing above the minimum may be acceptable. Thus, as shown in FIG. 12, the spacing can vary.

The outer perimeter 34 and the inner perimeter 32 of vessel 12 are both rectangles. The inner perimeter 32 and outer perimeter 34 can be different shapes which are different from one another. A general polygonal shape can be employed for either the inner perimeter 32 or the outer perimeter 34. Further, the shapes can include curved portions and can be asymmetrically configured. In addition, the outer perimeter 36 of the platform 16 can be formed as a general polygonal shape. In addition, its shape can include curved portions and can be asymmetrically configured.

The platform 16 can be subject to rotational forces. For example, wind can cause the platform 16 rotate when depending on the shapes of structures and their distribution on the platform 16. The platform 16 rotating 42 around point 44 is shown as an example.

In one example, the platform 16 can be designed for rotation. For example, a large enough space can be provided between the outer perimeter 36 of the platform 16 and the inner perimeter 32 of the vessel to allow for a partial or a full 360 degree rotation of the platform 16. With intentional rotation, the building 18 can be orientated during the day such that one side always faces the sun or the building makes a number of rotations during the day. Thus, a person could watch the sunrise from a window facing the sun in the morning and a sunset from the same window at night. A motor or some other force generating mechanism can be coupled to the platform to cause it to rotate.

For earthquake applications, it may be desirable to position the containment vessel relative to the construction platform so that a minimum spacing is maintained between the two components of the TPFS. In addition, it may be desirable for use purposes to keep the construction platform level as possible. As described above, various loading situation can occur that cause the platform to move from a desired orientation. In some embodiments, to prevent movements anchoring mechanisms can be utilized. Further, to reposition the platform when it has moved from a desired position, positioning mechanisms can be utilized. A few examples of loading situations involving anchoring and positioning mechanisms are described with respect to FIGS. 2A and 2B.

Figure 2A:
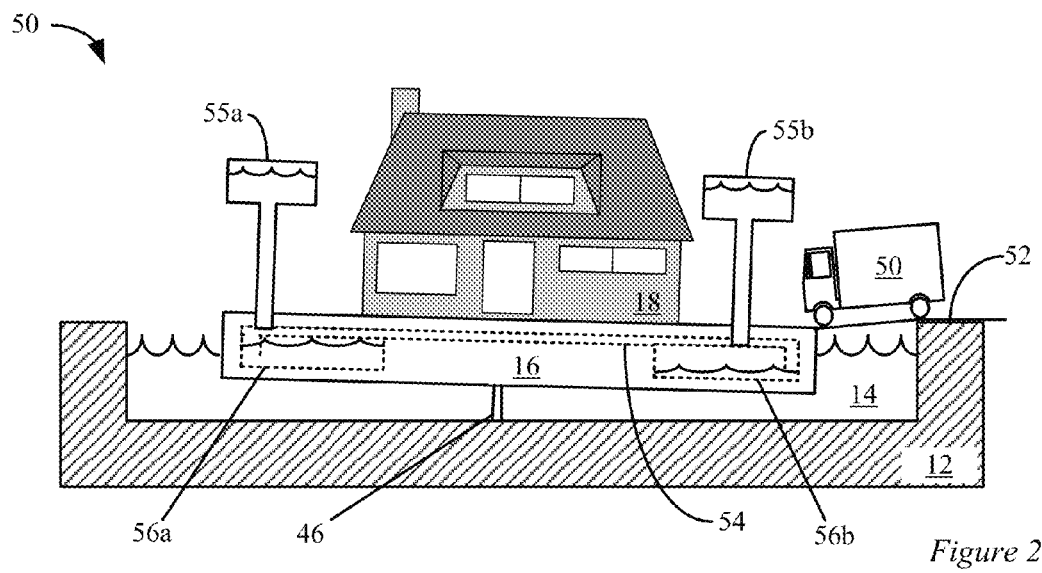
FIG. 2A is a block diagram of a building constructed on a three part foundation system including a leveling mechanism in accordance with the described embodiments.

In FIG. 2A, a truck 50 is shown driving onto the construction platform 16 using a ramp 52. The ramp 52 can be a permanently attached to the construction platform, such as via a hinge mechanism or can be temporarily attached to the construction platform. As an example of being temporarily attached, the ramp 52 can be configured to be raised up like a draw bridge on the containment vessel side 12 or the construction platform side. To allow a vehicle to pass, depending on the side in which it is raised, the ramp can be lowered down and can be temporarily secured to the construction platform 16 or to the containment vessel 12. It can also be secured near the containment vessel. The ramp or causeway can also telescope laterally into either the construction platform or the containment vessel to allow lateral movement while maintaining its function or may simply be allowed to slide over either the construction platform or the containment vessel.

When the ramp 52 is permanently secured to the construction platform 16 and the containment vessel 12, the ramp can also be used to hold the construction platform in place relative to the containment vessel. As described above, for earthquakes, it can be desirable to maintain a minimum spacing between the containment vessel 12 and the construction platform 16 such that the impacts between the two components is minimized during an earthquake. In addition, as described above, it is desirable to prevent the lateral motions of the earthquake from being transmitted from the containment vessel 12 to the construction platform 16. To prevent the transfer of the forces, the ramp 52 can be designed to break or detach in some manner from the construction platform 16 or the containment vessel 12 when sufficient lateral forces are generated to allow the construction platform and the containment vessel to move relatively independently of one another.

Like an electrical fuse, the breaking of the link above a threshold value can be referred to as a mechanical fuse. In one embodiment, the mechanical fuse can be designed for activation (link breakage) by the faster seismic P (compression) wave of an earthquake. Typically, the P-wave arrives at least a few seconds before the more destructive S-wave.

In related example regarding securing the position of the containment vessel relative to a construction platform, an attachment mechanism 46 is shown between the construction platform 16 and the containment vessel 12. One or more attachment mechanisms can be used to maintain a position of the construction platform 16 relative the containment vessel. The one or more attachment mechanisms can be non-weight bearing members. Further, like the ramp example described above, the one or more attachment members can be fused to detach in an earthquake to allow the containment vessel 12 to move relative the construction platform 16. In addition, during a flood condition, in which it is desirable to allow the construction platform 16 to rise up relative to containment vessel 12, the one or more attachment mechanisms, such as 46, can be configured to extend and/or detach.

In FIG. 2A, the platform is shown tilted as a result of the truck 50 moving on to the platform as compared to FIG. 1A. In general, adding additional weight onto to the construction platform 16 at a particular location can cause the platform to tilt. In one embodiment, the TPFS can include one or more weight distribution systems that can be used to level the construction platform 14. For example, the platform 16 includes a ballast system 54 for use as a weight distribution system. The ballast system in this example includes two connected tanks 56a and 56b. As described with respect to FIGS. 6A and 6B, more than two ballast tanks can be utilized.

In operation, a control system can determine a tilt of the construction platform 16 and then move liquid from one tank to the other tank to redistribute mass on the platform and level out the platform. For example, a liquid can be moved from tank 56b to 56a to add weight to the side of the platform 16 opposite the truck 50 to balance out the weight of the truck and level out the platform. In other embodiments, the tanks don't have to be connected. For example the platform 16 can include a number of independently controllable tanks which can be filled or emptied to change the mass distribution of the system. Other mass distribution system for leveling purposes can be utilized, such as movable solid weights, and the example of a ballast system is described for illustrative purposes and is not meant to be limiting.

In one embodiment, one or more vessels filled with a liquid, such as water, can be positioned on or above the construction platform. One or more sensors can be provided which can be used to detect a presence of a heavy object such as the truck 50. Data from the sensor can be used to trigger a release of liquid from vessels, such as 55a or 55b, to provide a reduction in weight in the platform which limits or prevents it from tipping. The liquid may drain out due to the force of gravity. For example, when a presence of the truck 50 is detected, a vessel, such as 55b, filled with water located on the same side of the platform as the truck 50 can receive a signal that causes the vessel to rapidly drain. The release of the water can cause the platform to lighten on the truck side which then can reduce the tilt of the platform resulting from the presence of truck 50.

Figure 2B:
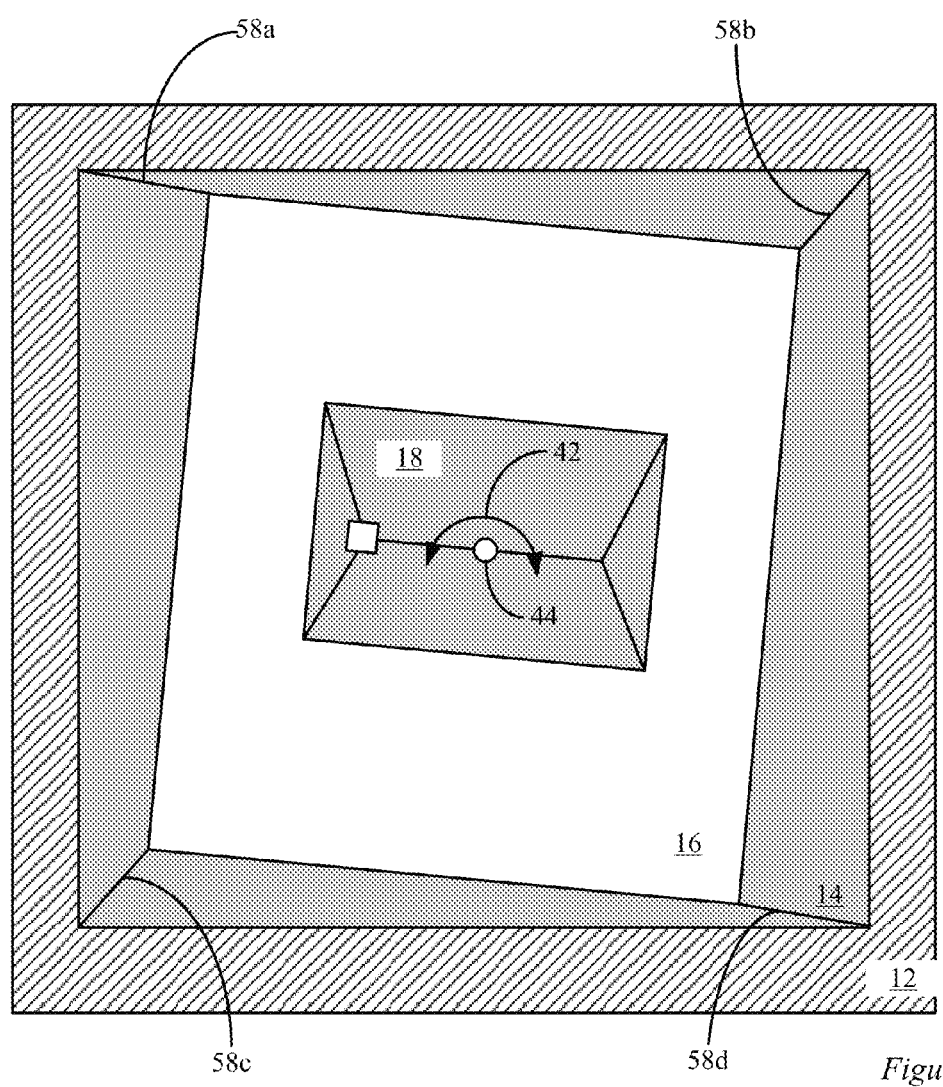
FIG. 2B is a block diagram of a building constructed on a three part foundation system including a centering mechanism in accordance with the described embodiments.

Next, with respect to FIG. 2B, additional positioning mechanisms are described. FIG. 2B is a top view of the TPFS including the building 18. In this example, a number of positioning cables 58a, 58b, 58c and 58d are shown attached to the construction platform 16. The positioning cables can be each coupled to motors or manually operated spools. The motor and/or spools can be used to adjust the length of and tension of each cable to position the construction platform relative to the containment vessel, such as shown in the FIG. 2B, when the platform 16 has rotated relative to the containment vessel.

In one embodiment, the positioning cables and associated cable length control mechanisms can be anchored to the containment vessel 12 or near the containment vessel 16. A sensor system can be used to determine a position of the platform 16 relative to the containment vessel 12. A control system which is coupled to the sensor can be used to operate the cable length control mechanisms to position the platform 16. In a flood, the cables can be lengthened to allow the platform to rise higher. In one embodiment, the cable attachments can be mechanically fused such the cables are released during a significant event, such as an earthquake or a flood event.

In another example, a number of motors can be coupled to a free floating platform 16, such at each corner of the platform 16. The motors, such as electric motors, may be separately controlled and directed to position the platform relative to the containment vessel. In yet another example, gyroscopes can be included with the platform 16 to provide a positioning force. In general, many different types of positioning mechanisms, which allow the construction platform to be moved, can be utilized and these examples are described for the purposes of illustration only.

Figure 2C:
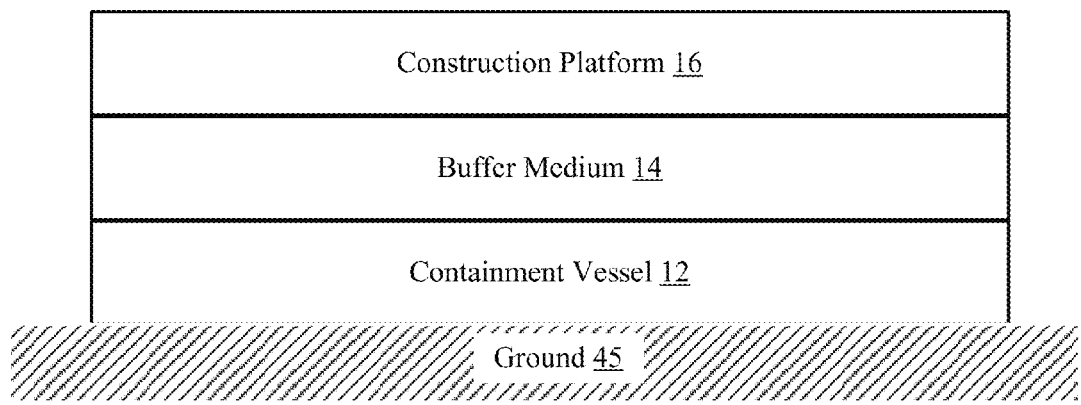
FIG. 2C is a block diagram of a three part foundation system.

In the examples of FIGS. 1A, 1B, 2A and 2B, the buffer medium has been primarily described as a liquid, such as water, where the containment vessel contains the buffer medium to a particular location and the construction platform "floats" on the buffer medium. In general, as shown in FIG. 2C, the construction platform 16 rests on the buffer medium 14, which rests on the containment vessel 12. The containment vessel 12 can be integrated into the ground 45.

The buffer medium 14 can be configured to minimize the transfer of seismic forces from the ground 45, through the containment vessel 12 to the construction platform 16. The buffer medium 14 can be constrained or closed in a structure of some type. For example, air or a liquid can be encased in a bladder, such as 15, which supports the weight of construction platform 16.

In the instance of a flood, the construction platform can be sufficiently buoyant to rise in the flood waters. When air bladders or some other enclosed lightweight structure are used as a buffer medium 14, the buffer medium 14 can be coupled to the construction platform to provide additional buoyancy during a flood. When a heavier buffer medium is used, such as bladders filled with water, the construction platform 16 can be configured to decouple from the buffer medium 14 in a flood condition.

In one embodiment, the buffer medium 14 can be a solid or a composite material. The solid or composite material can be configured to undergo a phase change to a liquid or a material that acts like a liquid during or just prior to an earthquake. For example, a current or heat can be introduced to a solid buffer medium material or some chemical reaction can be induced to cause it to turn into a liquid like substance during an earthquake. In another example, the buffer medium can include small solid particles which act like a liquid under the shaking conditions introduced during an earthquake.

In yet another embodiment, the construction platform 16 can be configured to rest directly rest on the containment vessel 12. During an earthquake, a magnetic interaction can be induced between the construction platform 16 and the containment vessel 12 which causes the construction platform 16 to levitate above the containment vessel. While levitating, an air gap is introduced between the two components. The air gap acts as a buffer medium 14. Further details of this embodiment are described with respect to FIGS. 16A, 16B and 16C.

Flood Design

Figure 3A:
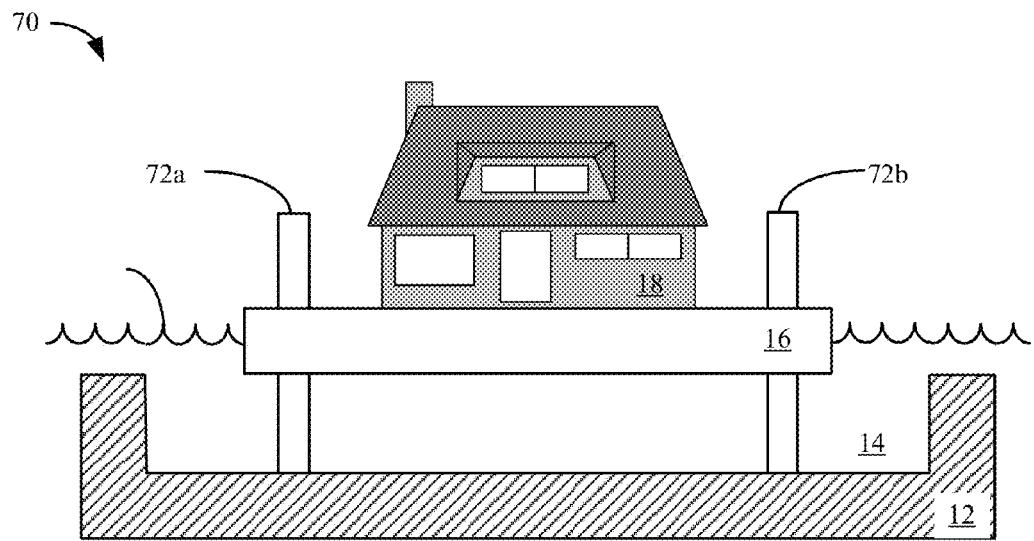
FIGS. 3A and 3B are block diagrams of a building constructed on a three part foundation system with a position stabilization mechanism for flood conditions in accordance with the described embodiments.
Figure 3B:
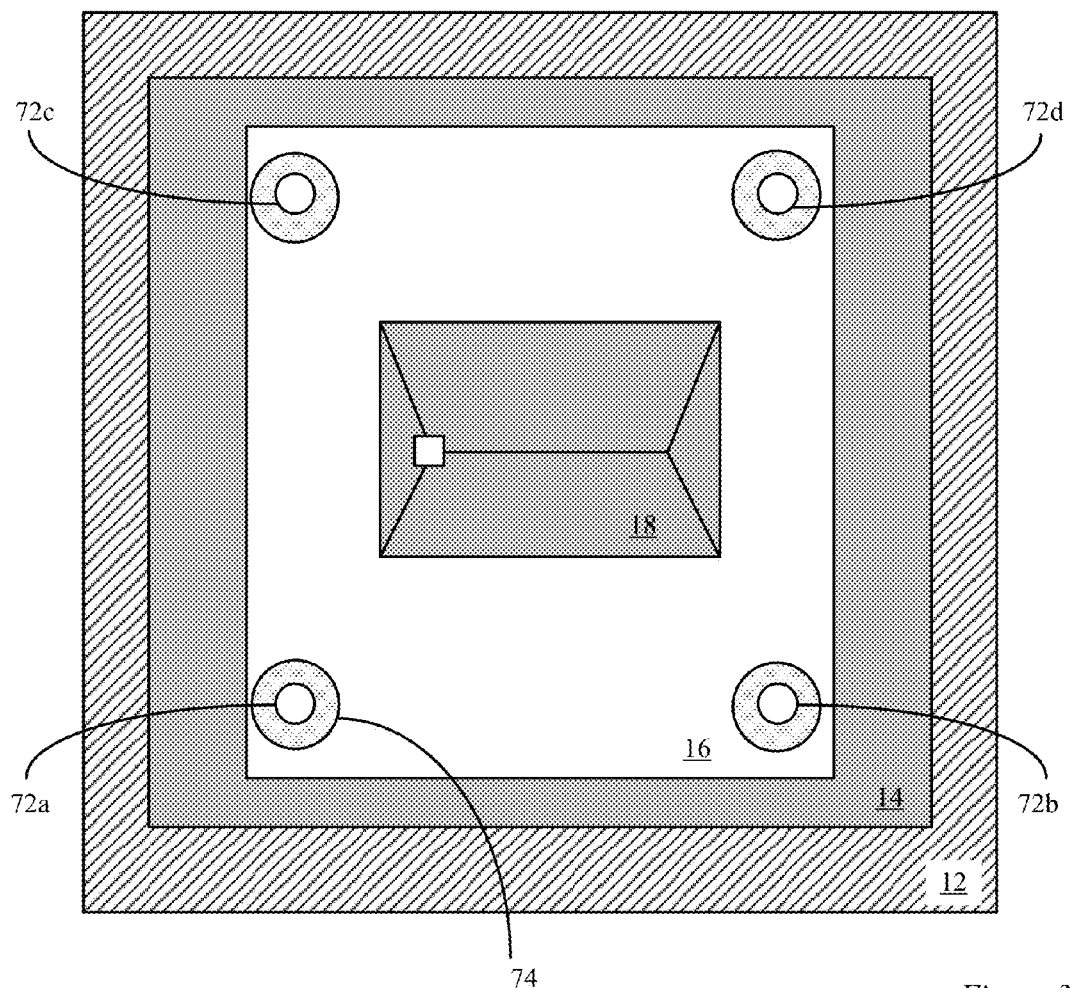

In this section some designs associated with flood performance are described. In FIGS. 3A and 3B, one configuration 70 of a building 18 constructed on a three part foundation system with a position stabilization mechanism for flood conditions is shown. In various embodiments, one or more cantilevered columns can be utilized to provide the position stabilization.

The cantilevered columns, such as 72a and 72b, can pass through an opening in the construction platform 12 and through the containment vessel 12 to allow the one or more cantilevered columns to be anchored in the ground beneath the containment vessel. In one embodiment, a compressible sealing mechanism, such as a compressible rubber seal, can be used between a cantilevered column and the containment vessel. The compressible sealing mechanism can be used to prevent the buffer medium from leaking out of the containment vessel at the cantilevered column/containment vessel interface. In addition, it can allow the cantilevered column to move relative to the containment vessel so that movements of the cantilevered columns don't crack or damage the containment vessel 12.

As shown in FIGS. 3A and 3B, the cantilevered columns, such as 72a, 72b, 72c and 72d, can extend above the height of construction platform 16. During flood conditions, the construction platform 16 can rise vertically as guided by the cantilevered columns while its position remains above the containment vessel 12. In the example of FIG. 3A, flood waters have filled the containment vessel and extend above the top of the containment vessel 12 causing the construction platform 16 to rise. When the flood waters subside, the construction platform 16 can sink as the water level drops.

In FIG. 3B, four cantilevered columns, 72a, 72b, 72c are 72d, are placed near the corners of the platform 16. In general, one or more cantilevered columns can be utilized where the cantilevered columns can be positioned anywhere in the interior of the platform 16. The aperture through the construction platform 16 can be sized to provide an adequate spacing distance between the platform and the cantilevered columns. The selected spacing distance can allow the platform 16 to move back and forth relative to the one or more cantilevered column during an earthquake without hitting or minimally impacting the cantilevered columns. To maintain the spacing of the platform relative to the cantilevered columns, as described above, one or more positioning mechanisms can be utilized.

Figure 4:
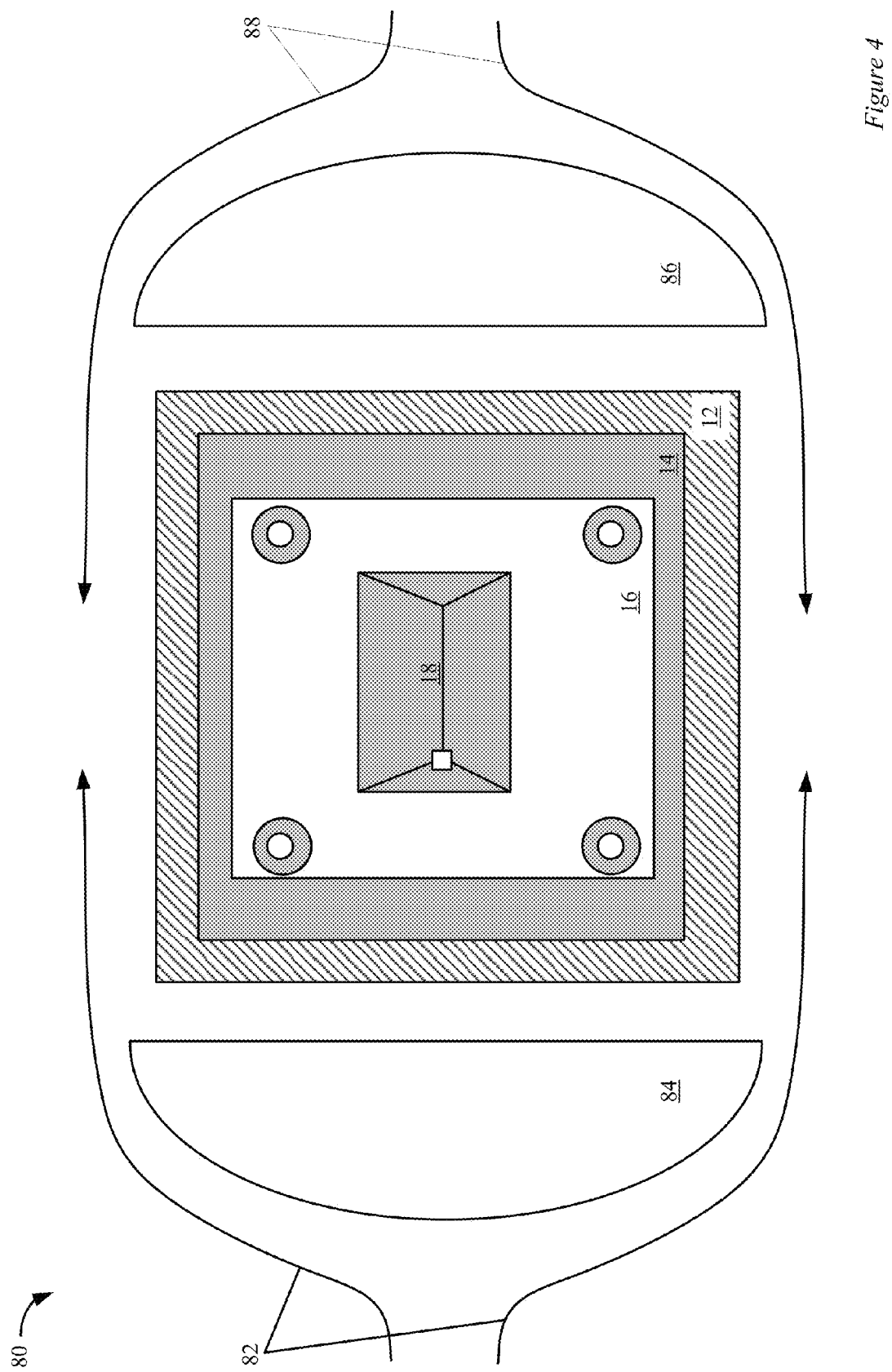
FIG. 4 is block diagram of building constructed on a three part foundation system with water diversion structures for flood conditions in accordance with the described embodiments.

In one embodiment, additional flood control measures can be utilized, such as water diversion mechanisms. FIG. 4 shows one configuration 80 of the building 18 constructed on a TPFS with water diversion structures, 84 and 86, for flood conditions. The TPFS includes four cantilevered columns, as described above in FIGS. 3A and 3B, which allow the construction platform 16 to rise relative to the containment vessel 12 during a flood. In addition, two water diversion structures 84 and 86 are shown. Water diversion structures can be used to divert water around the TPFS and the building to minimize lateral forces of the water on the entire TPFS while allowing controlled flooding.

In the example of FIG. 4, flood waters 82 are diverted around the structure 84 to prevent the water from directly impinging on the construction platform 16. The direction of the flood waters can vary depending on whether the flood waters are rising or receding. For example, the flood waters, such as 82, can occur as the flood water is rising. When the flood waters, such as 88, recede, the water diversion structure 86 can be used to divert the receding flood waters. If the velocity of the current is sufficient, the cantilevered columns can be damaged and/or broken. If the cantilevered columns are broken, it may be possible that the platform to floats away. The use of the water diversion structures, 84 and 86, can lessen the likelihood of the cantilevered columns breaking or being damaged during a flood.

The placement of the diversionary structures can depend on historical patterns of flooding. For example, for preventing flood damage from a tsunami, a diversionary structure can be placed in location expected to receive the greatest forces from arriving waters. A similar determination can be made for a building located in a flood plain or near a wash that seasonally floods.

Open to Body of Water Design

Figure 5A:
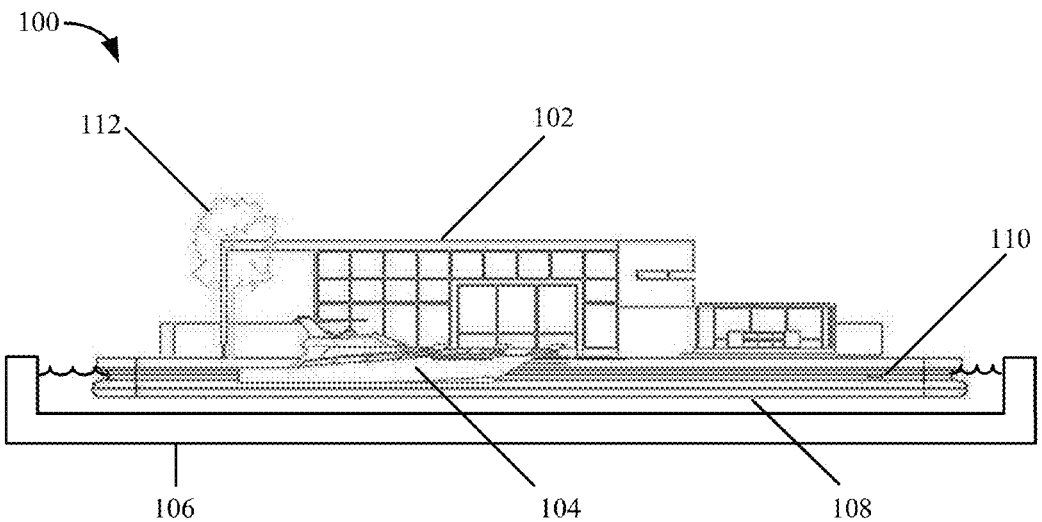
FIGS. 5A and 5B are block diagrams of a building constructed on a three part foundation system with waterway access in accordance with the described embodiments.
Figure 5B:
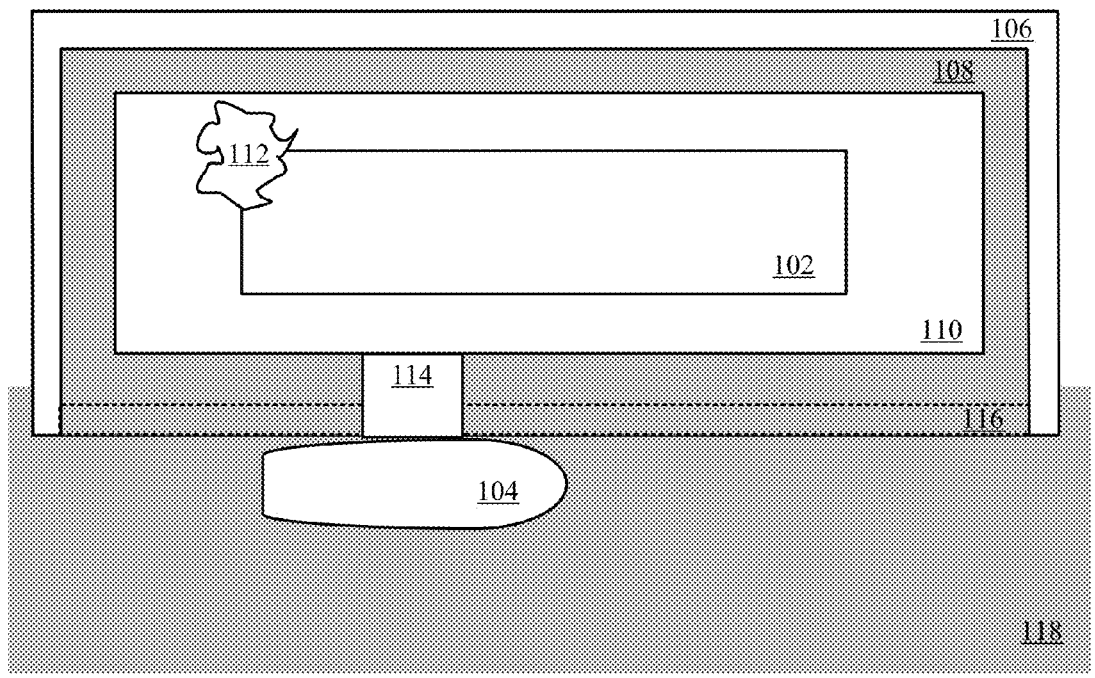

With respect to FIGS. 5A and 5B, a TPFS configured for use near a body of water is described. In the configuration 100 of FIGS. 5A and 5B, a building 102 and a tree 112 residing on top of a construction platform 110 is described. The containment vessel 106 is positioned next to a body of water 118. The body of water 118 can be a lake, a river, an ocean, etc. A boat 104 is docked next to the dock 114.

In one embodiment, the wall 116 of the containment vessel 106 facing the body water 118 can be lower than the surrounding walls. When water from the body of water 118 reaches the height of wall 116, water from the body of water 118 can mix with the buffer medium 108 of the TPFS. When water from the body of water 118 is below the height 116 of the wall, then the buffer medium 108 and the body of water are separated. In one embodiment, a pump can be used to pump water from the body water 118 and into the containment vessel to keep the containment vessel 106 filled. This function can be useful when the water level of the body of water 118 is below the height 116 of the wall for a significant amount of time, such as during a drought.

Constructing a TPFS

Figure 6A:
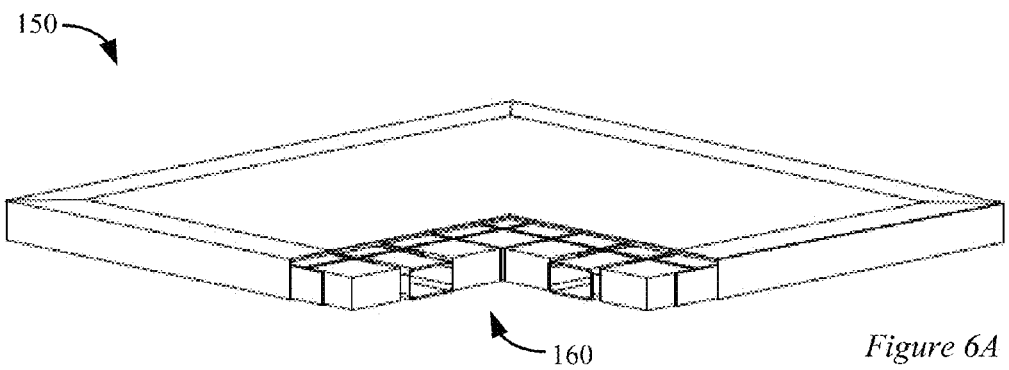
FIGS. 6A and 6B are perspective drawings of a construction platform for a three part foundation system in accordance with the described embodiments.

In this section, methods for construction a TPFS are described. In particular, structures associated with the construction platform are described with described with respect to FIGS. 6A-8C and a method of constructing the TPFS is described with respect to FIG. 9. In FIG. 6A, an assembled construction platform 150 for a TPFS is shown. A cutaway section 160 is included to expose an interior portion of the construction platform 150. The construction platform 160 is shown for purposes of illustration only and is not meant to be limiting. For example, as described above, the shape of the platform 160 is not limited to a rectangular shape as shown in FIG. 6A and can be arbitrarily shaped as described above.

Figure 6B:
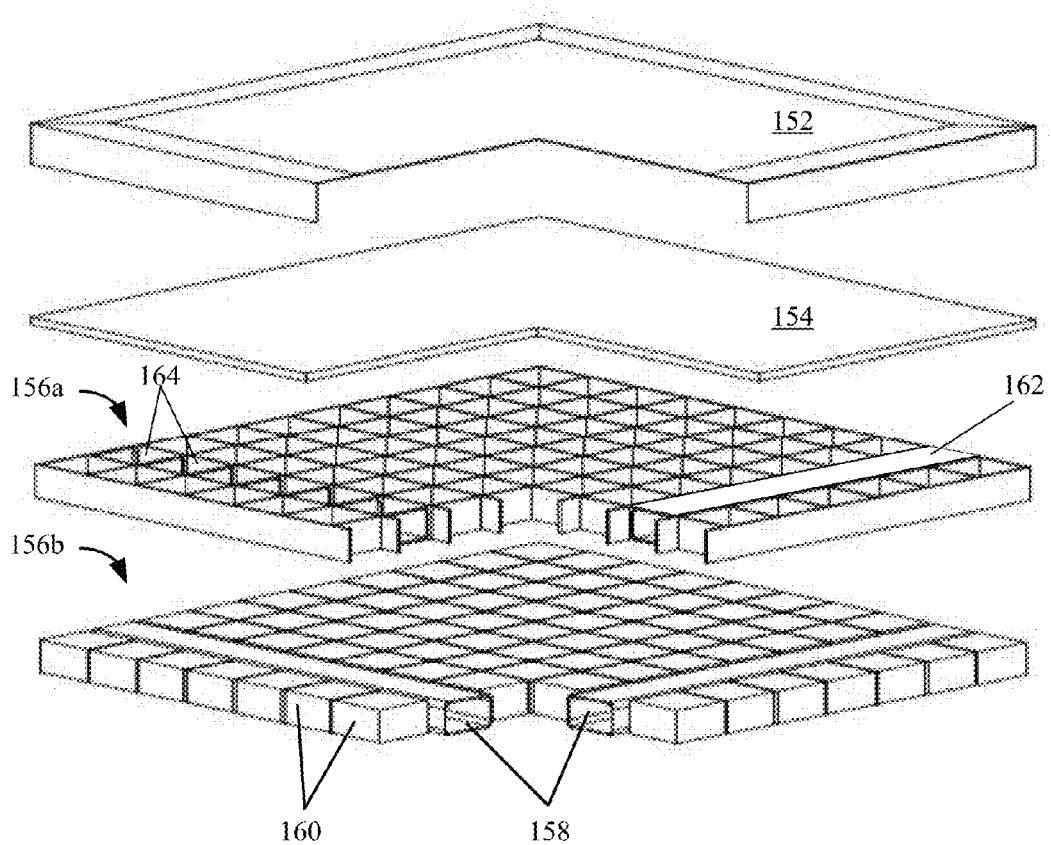

In FIG. 6B, different layers of the construction platform 150 are shown. The top layer can be decking. A building can be built over the top of the decking 152. Layer 154, beneath the decking, can be a sub-floor system, such as concrete slab. In one embodiment, a gap can be provided between the decking 152 and the sub-floor system 154 to run utilities. In another embodiment, a structure can be built directly on top of the sub-floor system without the use of decking 152. In yet another embodiment, the decking may only cover a portion of the sub-floor system 152, such in an area surrounding a building.

In one embodiment, the sub-floor system layer 154 can be formed by arranging a number of blocks, such as 160, of a low density material. Typically, the density of the material is significantly less than the density of water. For example, the blocks can be generated from closed-cell polystyrene foam, polyethylene foam or neoprene rubber foam. The density of polystyrene foam is between about 28-45 kg/m$^3$ which compares to a density of water which is about 1000 kg/m$^3$. In this example, the blocks are rectangular shaped. In other embodiments, as described respect to FIGS. 8A, 8B and 8C, blocks of different shapes can be used.

The blocks in layer 156*b*, such as 160, can be arranged with spaces between the blocks. Forms can be used around the outside perimeter. Then, concrete can be poured over the top of the blocks such that the concrete fills the spaces between the blocks and forms a layer above the blocks. The concrete structure between the block is shown in layer 156*a*. The concrete can be poured above the blocks to some thickness to complete sub-floor system 154.

In one embodiment, one or more larger voids can be left between the blocks 160. For example, one of the blocks can be removed in layer 156*b*. In one embodiment, the void can be covered such that the top of the void is covered in concrete or another foundation material. In another embodiment, the void can extend through platform 150. For example, the void can allow a cantilevered column or some other structure to pass through platform as described above with respect to FIGS. 3A and 3B.

In the example of FIG. 6B, two hollow tubes 158 are placed between the blocks. In one embodiment, the hollow tubes 158 can be filled with water as part of a ballast system as described above with respect to FIG. 2A. In another embodiment, after the sub-floor system 154 is generated, the hollow tubes 158 can be removed. Then, a number of independently fillable tanks, such as tanks the size of blocks 160 can be placed in the void left by the tubes. If desired the tanks can be connected to one another to allow a liquid to be transferred from one tank to another tank. In FIG. 6B, a number of compartments 164 for smaller tanks and one larger tank 162 are shown in layer 156*a*. Other mechanisms or structures can be placed in any of the compartments formed in the platform 150 and the example of tanks is provided for the purposes of illustration only.

Figure 7A:
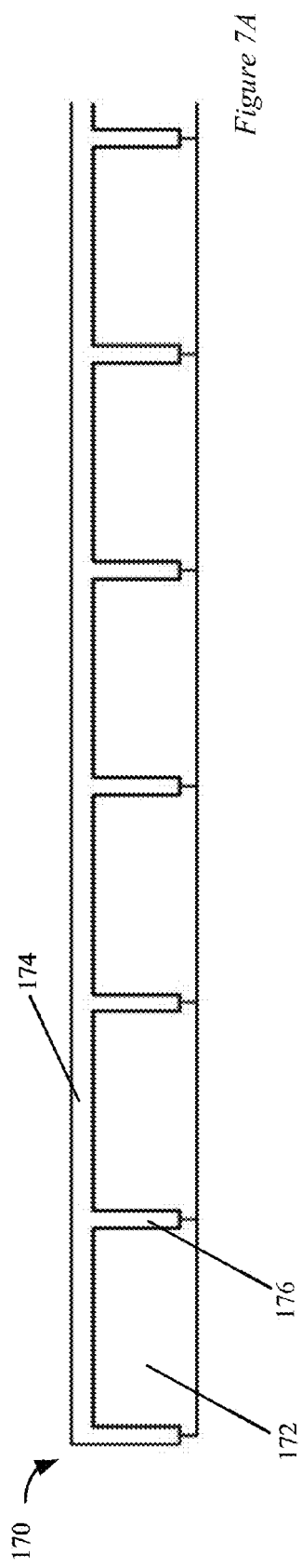
FIGS. 7A and 7B are section views of construction platform components for a three part foundation system in accordance with the described embodiments.

Another example of a construction platform 170 is shown in FIG. 7A. In this example, rectangular blocks 172 have been arranged touching one another and then channels have been formed in the blocks. The channels don't reach all the way through the blocks. Concrete is poured such that it fills the channels and covers the blocks to form top layer 174 and channel structures, such as 176.

In FIG. 7A, the channels are shown formed where the adjacent blocks touch. In another embodiment, the channels can be formed in the center blocks, such that there is no crack below the channel structure 176. In yet another embodiment, blocks can be formed with a lower lip. Thus, when arranged, the lips of the blocks touch and a channel is formed above the lips. This channel can be filled with concrete when the sub-floor system is generated.

Figure 7B:
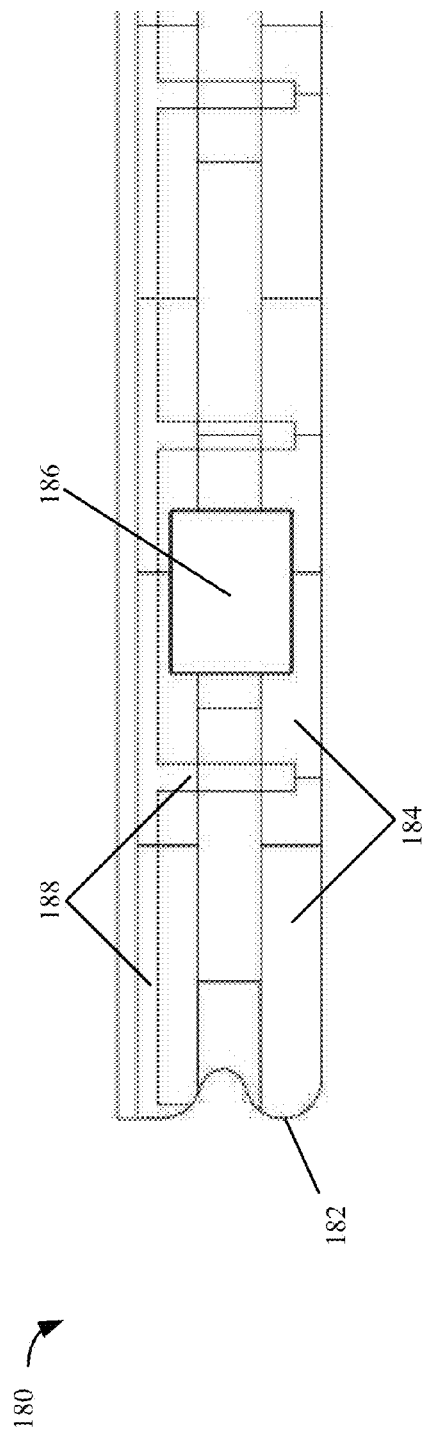

In FIG. 7B, another configuration of a construction platform 180 is shown. For configuration 180, blocks, such as 184, are bonded to together in a layered structure. For example, the blocks, such as 184, can be bonded together using an epoxy of some type. If desired voids, such as 186, can be carved in the blocks or the blocks can be arranged such that a void is formed. The void 186, as shown in FIG. 7B, is cut through multiple blocks. The block in each layer can have different material properties if desired. Further, the blocks in each layer can be different shapes.

In other embodiments, the blocks can be shaped or carved to generate a structure of some type. For example, curved portions can be cut off of the blocks. In 182, a number of curved portions have been cut off the blocks to form a curved bow. As will be described below in more detail (e.g., see FIGS. 10A and 10B), a curved bow can be used to mitigate wave action in the buffer medium. As described above with respect to FIG. 7A, channels can be carved in the blocks. In 180, the channels are filled and a top layer is formed over the channels to generate a sub-floor system 188.

Figure 8C:
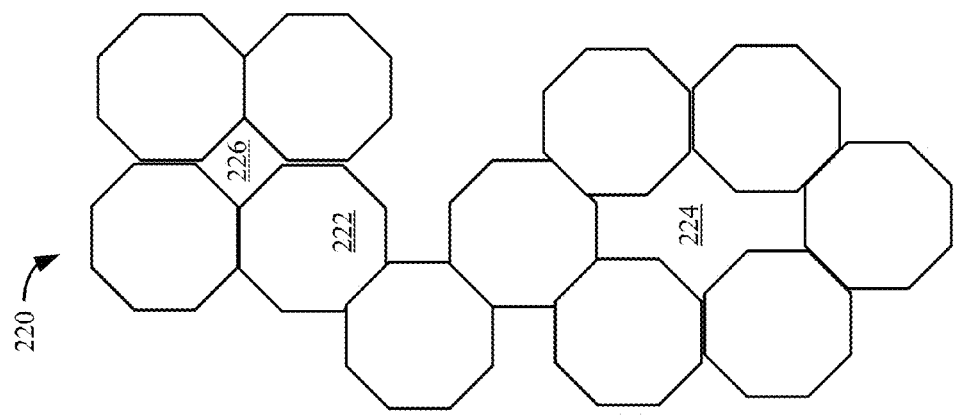
FIGS. 8A, 8B and 8C are block diagrams showing examples of modular units for forming a construction platform in accordance with the described embodiments.

As described above, different shaped blocks can be used to form a construction platform. In FIG. 8A, a structure 200 is formed from triangular blocks, such as 202, to generate a six-sided construction platform. Channels can be carved in the blocks or spaces can be left between the blocks to allow a sub-floor system to formed over and penetrate into the blocks as described above. In the example of FIG. 8A, the blocks, such as 202, surround a void 204. In one embodiment, the void can extend through the sub-floor system such that a void is left through the construction platform. In another embodiment, the void 204 can be covered by the sub-floor system. As described, a structure or mechanism can be located in the void 204, such as one or more ballast tanks.

In one embodiment, the blocks can be cubic or take on other three-dimensional shapes, as a tetrahedron. The three dimensional blocks can be pre-formed with voids or channels for receiving cables or piping used for providing utilities. In another embodiment, a low density three-dimensionally shaped unit and a sub-floor can be prefabricated as a single unit. Attachments points can be provided with each of these pre-fab units, which allow them to be linked to one or more other units. A number of the units can be link via the attachment points to form a construction platform.

Figure 8B:
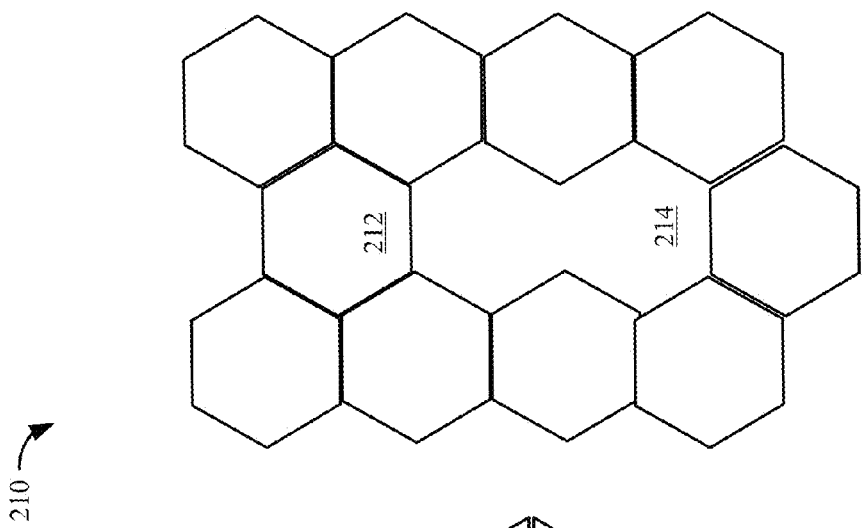
Figure 8A:
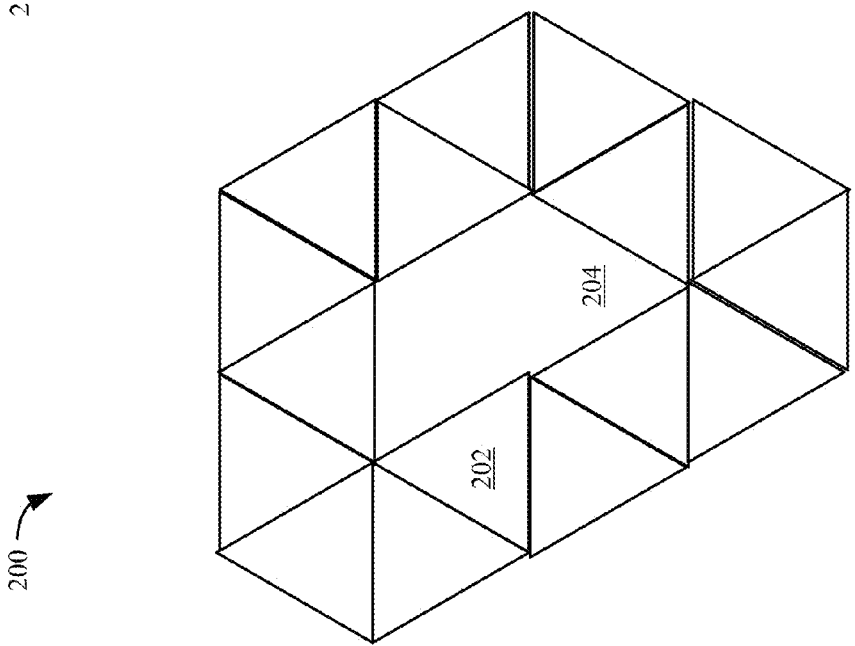

In FIG. 8B, a structure 210 for a construction platform is formed using hexagonal shaped blocks, such as 214. The blocks are arranged to form void 204. If the construction platform follows the sides of the blocks, then a twenty-five sided platform formed. In another embodiment, a rectangular sub-floor system can be formed over the ten hexagonal blocks to generate a four-sided construction platform.

In FIG. 8C, eleven octagonal shaped blocks, such as 222, are used to form a structure 220 used in a construction platform. The blocks can be arranged to form voids 224 and 226. The voids are shaped differently. A sub-floor system, such as a poured concrete system, can be formed above the structure 220. In alternate embodiments, combinations of different shaped blocks can be used. For example, the triangular shaped blocks, such as 202, can be combined with the hexagonal shaped blocks 212 to form a structure (not shown).

Figure 9:
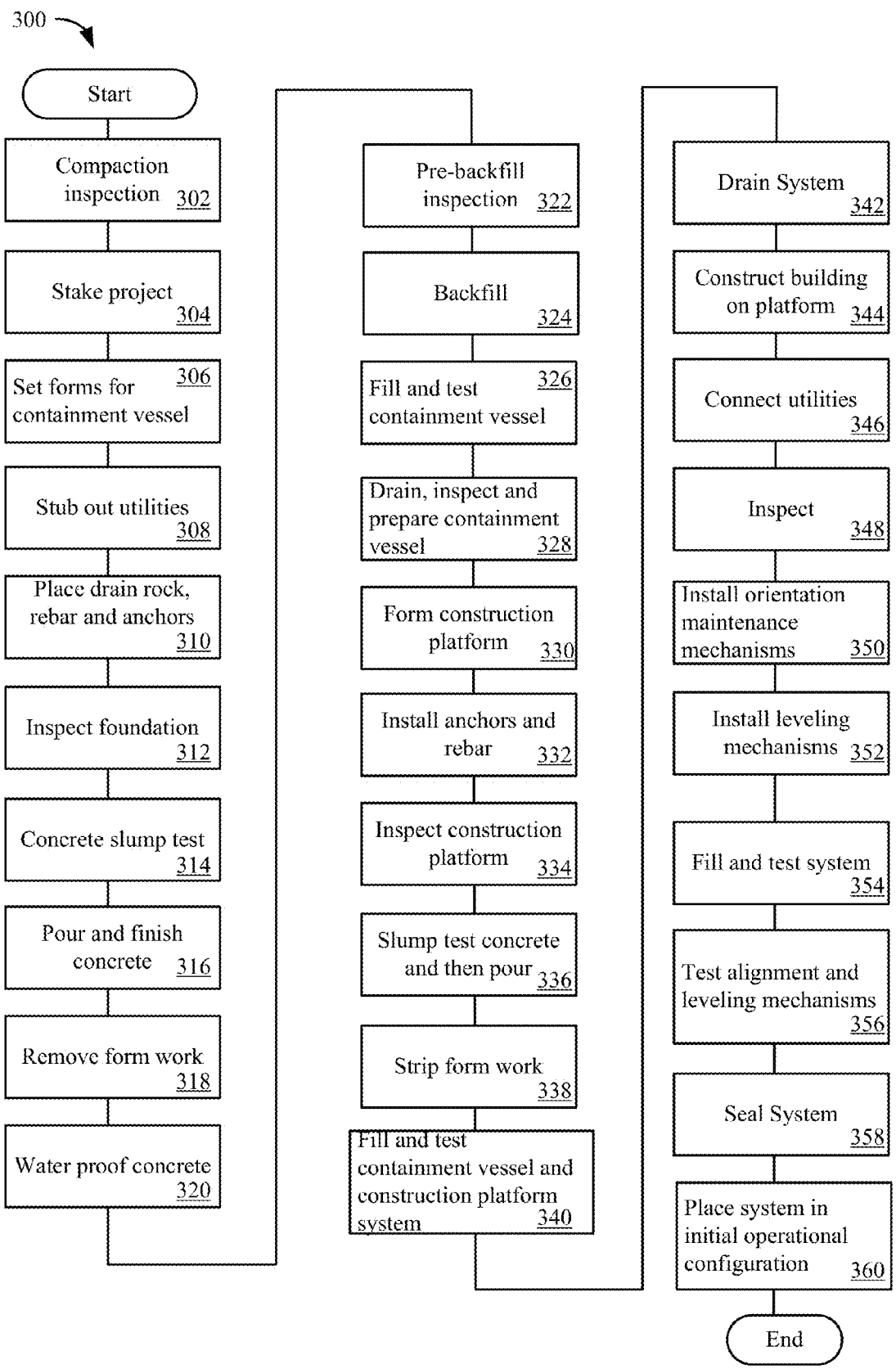
FIG. 9 is a flow chart of a method for forming a three part foundation in accordance with the described embodiments.

Next details of methods of constructing a TPFS (Three Part Foundation System) are described. FIG. 9 is a flow chart of a method 300 for forming a TPFS. In 302, a compaction inspection can be performed. The compaction inspection can determine if the soil is in a state, such as a dense enough state, which can support the proposed construction including the TPFS. In 304, the project can be staked out. The stakes determine locations of certain components, such as the boundaries and the elevations of the containment vessel(s).

In 306, forms for the containment vessel can be placed. The forms provide molds into which a material used for the foundation, such as concrete, can be poured. In 308, utilities can be stubbed. In this process, objects which form passages through containment vessel can be placed. For example, plumbing pipes and/or electrical conduits can be laid out in locations where concrete is to be poured and then the concrete used to form the containment vessel can be poured over these pipes and conduits.

Areas can be dug out under the foundation (under slab). In 310, these areas can be filled with drain rock. Pipes can be coupled to the drain to allow water to be drained away and prevent moisture build up underneath the foundation. Traditional foundations typically require a moisture barrier between the drain rock and the foundation. In this method, since the containment vessel is likely to be filled with water, the moisture barrier may not be required. Next, in 310, rebar and anchors can be placed above the drain rock.

In 312, the foundation area can be inspected prior to pouring the concrete. When it is satisfactory, the foundation work can continue. In 314, a concrete slump test is performed. The concrete slump test is used to determine that a batch of concrete which is to be poured is satisfactory for use in the foundation. When the concrete is satisfactory, in 316, the concrete can be poured, finished and allowed to cure.

In 318, the form work can be removed. In 320, the concrete associated with the containment vessel can be water-proofed. In one embodiment, water proofing can involve mixing an additive with the concrete to generate a water proof concrete, such as a crystalline waterproof concrete. In another embodiment, water proof membranes can be applied to the concrete.

Typically, areas around the containment vessel will have been dug out. After the containment vessel is formed, the excavated areas can be filled in. In 322, an inspection can be performed to make sure the containment vessel is ready for the backfill material and to determine whether there are any flaws in the containment vessel foundation before it is covered with the backfill material.

In some instances, the backfill material can exert a force on the containment vessel, such as on sidewalls of the containment vessel. Thus, the inspection can be performed to make sure the containment vessel is ready to support the forces exerted from the backfill material. In 324, the backfill material is added.

In 326, the containment vessel can be filled with the buffer medium, such as water. The containment vessel can be observed and tested to make sure it is adequately containing the buffer medium. In 328, the containment vessel can be drained and inspected. Then, it can be prepared for the formation of the construction platform. For example, the boundaries of the construction platform can be marked in some manner.

In 330, the construction platform can be formed. Some examples of methods for forming the construction platform have been described above. For example, foam blocks can be arranged in some manner over the containment vessel and forms can be constructed within and around the foam blocks. If necessary, material can be removed from the blocks to form features, such as channels or voids. In one embodiment, as described above in FIG. 7B, layers of foam blocks can be bonded together. In 332, rebar and anchors can be installed, such as in the gaps between the blocks or where channels have been formed in the block. In another embodiment, a concrete structure can be traditionally formed and poured and then the foam can be added afterwards as a liquid, spray or solid.

In various embodiments, prestressed or poststressed concrete can be used. Prestressed concrete is concrete that has had internal stresses introduced to counteract, to the degree desired, the tensile stresses that will be imposed in service. The stress is usually imposed by tendons of individual hard-drawn wires, cables of hard-drawn wires, or bars of high strength alloy steel. Prestressing may be achieved either by pretensioning or by post-tensioning.

To pretension concrete the steel is first tensioned in a frame or between anchorages external to the member. The concrete is then cast around it. After the concrete has developed sufficient strength the tension is slowly released from the frame or anchorage to transfer the stress to the concrete to which the tendons have by that time become bonded. The force is transmitted to the concrete over a certain distance from each end of a member known as the transfer length.

Post-tensioned concrete is made by casting concrete that contains ducts through which tendons can be threaded. An alternative is to cast the concrete around tendons that are greased or encased in a plastic sleeve. When the concrete has sufficient strength the tendons are tensioned by means of portable jacks. The load is transmitted to the concrete through permanent anchorages embedded in the concrete at the ends of the tendons. Ducts are usually grouted later or filled with grease to protect the tendons against corrosion. In some applications the post-tensioning tendons are run alongside the concrete member. One advantage of post-tensioning is that it permits using tendons that are curved or draped. (This can be achieved in pretensioning but not so easily.) Post-tensioning can be done on the jobsite without any need of heavy temporary anchorages.

In 334, an inspection of the construction platform prior to the pouring the foundation material (e.g., concrete) can be performed. When the construction platform is satisfactory, concrete pouring can proceed. When a batch of concrete is generated, in 336, a concrete slump test can be performed prior to pouring it. Then, in 336, if the concrete is determined to be satisfactory, it can be poured. After pouring, the concrete can be finished and allowed to cure. After sufficient curing, the form work can be removed.

In an alternate embodiment, all or a portion of steps 330 to 338 can be performed off-site. For example, the construction platform can be entirely pre-fabricated in a number of sections. The sections can be delivered to the construction site. Then, these sections can be assembled above the containment vessel. In another example, if the containment vessel is located next to a body of water as shown in FIGS. 5A and 5B, it may be possible to assemble the construction platform, float it on the water and then tow it to the location of the containment vessel.

In 340, the TPFS can be tested. For example, the buffer medium can be added to the containment vessel. The addition of the buffer medium can cause the construction platform to float on the buffer medium when a sufficient amount is added. The TPFS can be observed to determine whether the desired flotation and fill levels are being maintained for the TPFS Next, in 342, the TPFS can be drained. In 344, a building can be constructed on the construction platform. In 346, the utilities for the construction platform and/or the building can be connected. In 348, the utility connections can be tested and inspected. For a residential building, the testing may be used to ensure water, electricity, gas and/or sewage are being handled properly.

In 350, orientation maintenance mechanism can be installed. For example, the construction platform can be coupled to a cabling system as described above. In 352, leveling mechanisms, if they have not already been integrated into the construction platform, can be installed. For example, mechanisms, such as ballast tanks and/or other systems which can be used to transfer a weight from one location to another can be installed.

In 354, the TPFS can be again filled such that the construction platform floats. In 356, the alignment and leveling mechanisms can be tested. For example, ballast tanks can be filled or emptied and a position maintenance system, such as a cabling system, can be tested. In one embodiment, as described below with respect to FIG. 11A, in 358, the TPFS can be sealed in some manner. For example, a cover can be placed over the buffer medium to prevent contamination from debris and/or evaporative losses.

In 360, the TPFS can be placed in an initial operation condition. For example, the construction platform can be leveled. Further, the construction platform can be positioned relative to the containment vessel in a desired orientation. For example, as described above, the construction platform can be positioned such that some minimum spacing is maintained between the construction platform and features of the containment vessel, such as a sidewall. One the structure is complete and all live loads (people equipment, furniture, vehicles, etc.) are accounted for the entire system can be fine-tuned and re-leveled continually as required.

TPFS Design Configurations

Figure 10A:
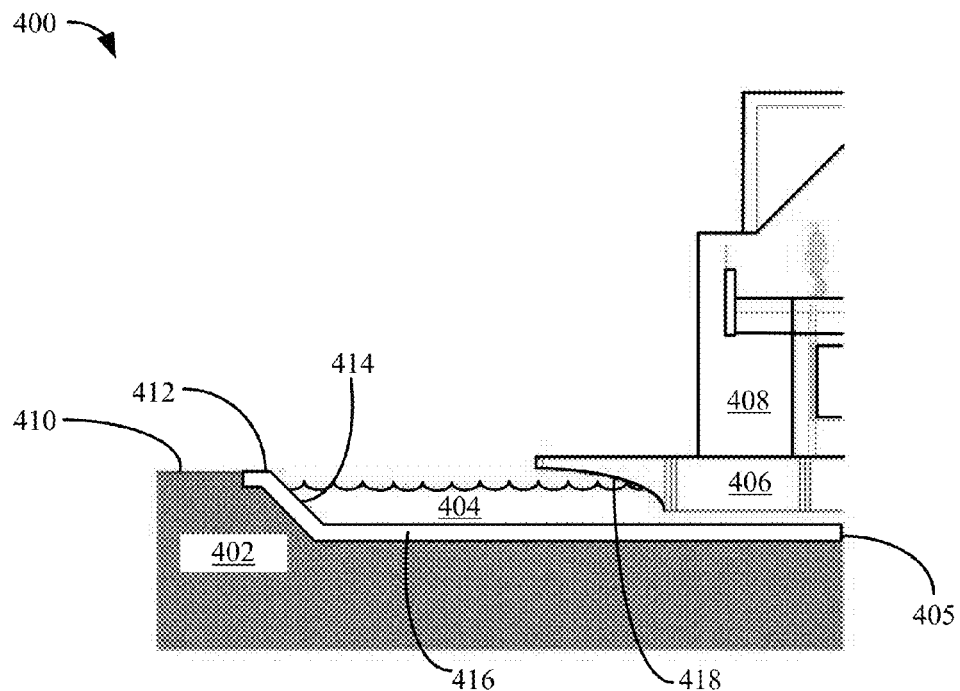
FIGS. 10A and 10B are section views including examples of containment vessel components and construction platform components in a three part foundation system in accordance with the described embodiments.

In this section, a number of different possible design configurations of a TPFS, such as different shapes and configurations for a containment vessel and a construction platform, are described with respect to FIGS. 10A to 15C. In FIGS. 10A and 10B, two TPFS configurations, 410 and 420, each including a containment vessel 405, a buffer medium 404 and a construction platform 406 is shown. A multistory building 408 is built on top of the TPFS. The TPFS is constructed over and integrated into some medium 402, such as compacted soil.

In this example, the containment vessel has a slanted sidewall 414. In some instances, it may be desirable to shape a sidewall, such as 414, to effect wave propagation within the buffer medium 404. It is believed adding slant to the sidewall can lessen wave propagation. Another benefit of a slanted sidewall is that it may make egress out of the containment vessel easier, such as if someone accidentally fell into to the buffer medium 404 within the containment vessel 405.

Figure 10B:
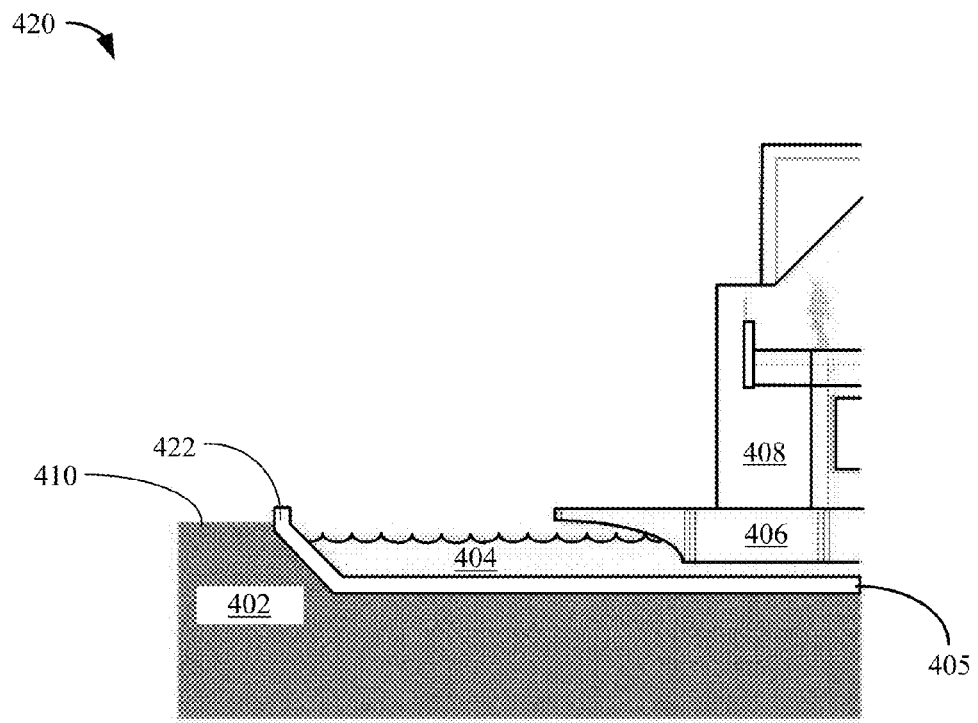

The construction platform 406 includes a curved bow. The curved bow can be used to lessen wave action in the buffer medium 404. Further, it can be used to reduce forces from the waves transmitted into the construction platform such that unwanted vibration or rocking doesn't occur. Many bow shapes are possible and the example shown in FIGS. 10A and 10B is for the purposes of illustration only.

The sidewall 414 of the containment vessel merges into an end portion. In FIG. 10A, the end portion 412 is flush with the material 410 (e.g., soil) surrounding the containment vessel 405. In FIG. 10B, the end portion 422 is raised. A raised end portion can prevent debris being carried into the containment vessel, such as debris carried by water when it rains. In another embodiment, if the containment vessel is near a body of water, such as an ocean, the end portion 422 can be configured to act as a seawall.

Figure 11A:
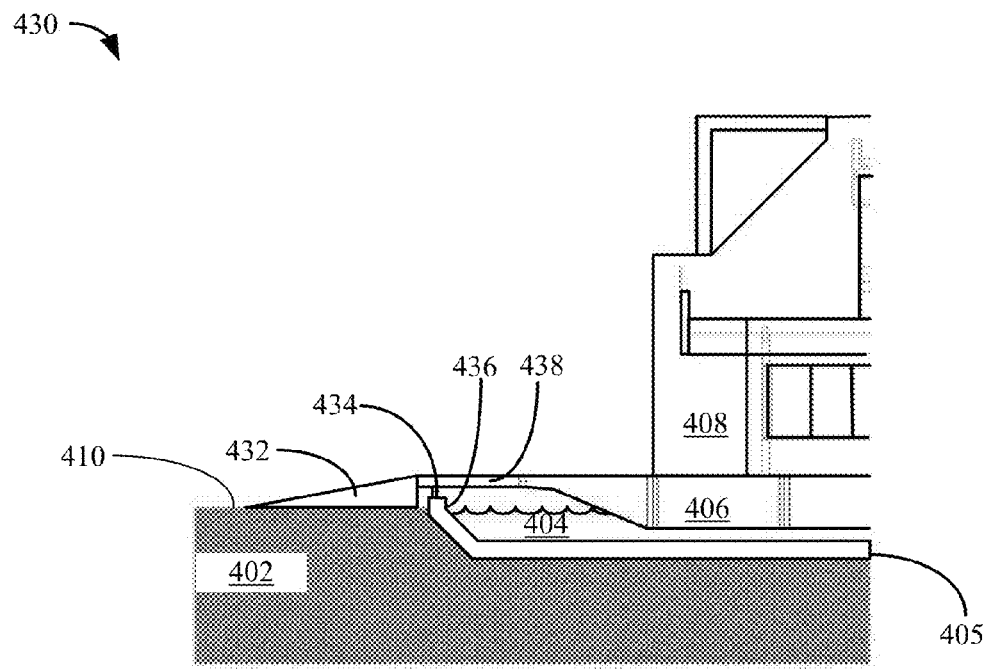
FIGS. 11A and 11B are section views including examples of containment vessel components and construction platform components in a three part foundation system in accordance with the described embodiments.

In FIG. 11A, a third TPFS configuration 430 is shown. In 430, the construction platform 406 includes an extended portion 438. It extends beyond the edge of the containment vessel 405 and interfaces with a ramp 432 placed on the material 410 surrounding the containment vessel 405. Similar to FIG. 10B, the containment vessel 405 includes a slanted sidewall and a raised end portion 436. A sealing mechanism 434 is secured to the top of the end portion 436 of the containment mechanism and a bottom of the extended portion 438 of the construction platform.

The sealing mechanism 434 can prevent evaporation of the buffer medium 404 if the material is prone to evaporation. In addition, it can prevent insects and small animals away from the buffer medium 404. Further, it can prevent debris, such as dirt, leaves or trash, from entering the buffer medium 404. The sealing mechanism 434 can extend around all or a portion of the perimeter of the containment vessel. In one embodiment, the sealing mechanism can be formed from a flexible material, such as a flexible polymer membrane. In another example, netting or some other permeable material can be used. The netting can allow air and water to pass through but prevent larger objects, such as dirt, animals, larger debris, etc. from entering the buffer medium.

Figure 11B:
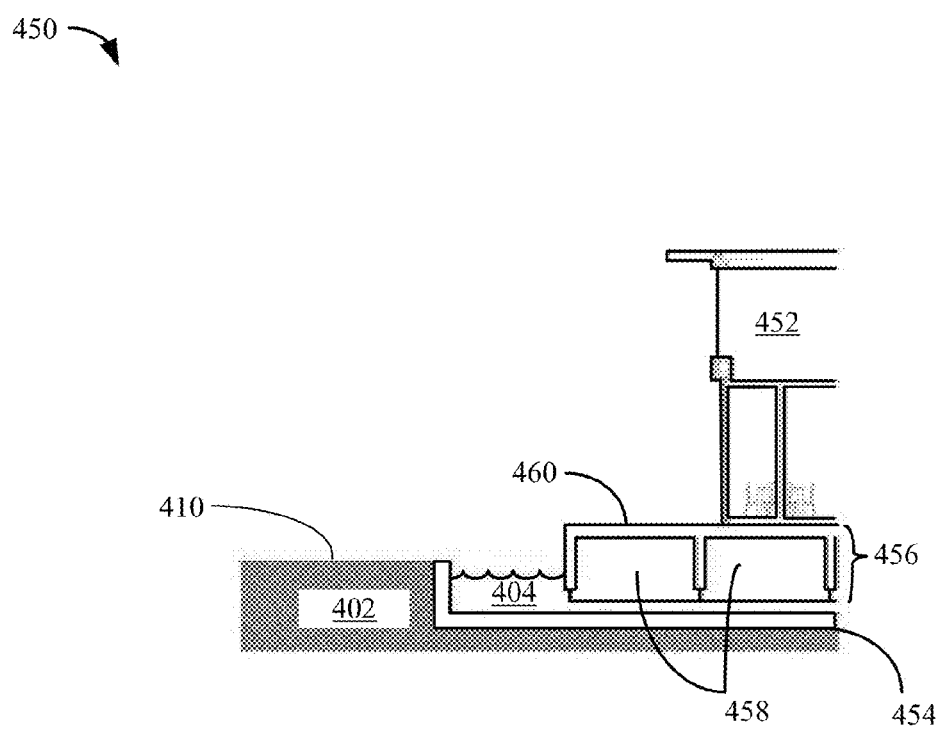

In FIG. 11B, yet another TPFS configuration 450 is shown. In this example, the containment vessel 454 includes vertical sidewalls. The construction platform 456 includes low density blocks, such as 458, and a sub-floor system 460 which is formed around the blocks 458. The sub-floor system structure 460 extends into channels between the blocks (e.g., see FIG. 7A). A building 452 is constructed over the TPFS.

Next, with respect to FIGS. 12A and 12B, two TPFS configurations, 500 and 520 supporting a large multi-story building 512 are described. In 500, the TPFS includes a containment vessel 504, a buffer medium 506 and a construction platform 508. The construction platform 508 supports the building 512. The construction platform 508 includes a number of low density blocks 510.

In 520, the containment vessel 526 extends beyond the edge of the FIG. 12B. The construction platform 508 includes two layers. In the first layer, blocks 510 are utilized. In the second layer, blocks 524 are utilized. The additional blocks 524 in the second layer provide additional buoyancy to the construction platform 512. In FIG. 12B, the blocks 524 span the length of the building 512. In other embodiments, the blocks, such as 524, can be discontinuous such that voids are formed.

In yet other embodiments, more blocks can be provided in additional layers. The additional layers can add additional buoyancy to the construction platform, such as to support the weight of a building at a particular location. Further, additional layers can allow for a portion of building 512 to extend into the construction platform and possibly below the water line. For example, a swimming pool can be integrated into the construction platform.

Next, with respect to FIGS. 13A and 13B, two TPFS configurations, 530 and 540, which support a multistory building are described. In 530, the TPFS is constructed on and integrated with the ground 502. A containment vessel for the TPFS has a number of different levels which allow for different depths of the buffer medium. In particular, the TPFS includes portions 534a and 534b which have a first depth and portion 536 between 534a and 534b which has a second depth. As shown in FIG. 13A, the buffer medium 506 covers each of the portions, 534a, 534b and 536, respectively. However, the depth of portion 536 can be high enough or the level of the buffer medium low enough such that the buffer medium no longer covers portion 536.

In 530, the construction platform 538 includes two separate portions 532a and 532b which are primarily used to provide buoyancy of structure 512. The separate portions 532a and 532b of the construction platform 538 float in the two portions of the containment vessel, 534a and 534b. Between the two portions 532a and 532b, i.e., the portion of the construction platform 538 over section 536 of the containment vessel, the structures used to provide buoyancy are minimal. In some instances, the construction platform can be configured such that the portion 538 is above the buffer medium during normal operating conditions. The design is similar to a catamaran including two pontoons.

In 540, the TPFS includes two separate containment vessels 544a and 544b. The containment vessels provide buoyancy, via buffer medium 506, for two portions, 542a and 542b, of the construction platform 552. The construction platform 552 supports building 542. A connection to the buffer medium (e.g., a pipe) can join the separate containment vessels to ensure equal buffer medium levels and therefore a level construction platform. Additionally, separate construction platforms can be located together or within one another to provide differential heights as in a factory setting where underside access to a massive object is desired. Additionally, the entire TPFS can be repeated and installed within an external TPFS where extreme sensitivity/adjustability or isolation is required.

Between the two buoyancy providing portions 542a and 542b, the construction platform 554 is raised to a height above the ground 548. The height above the ground provides sufficient clearance for objects, such as cars 550, to be placed underneath the building 542. The height of the construction platform 554 can be sufficient so that even if the buffer medium 506 is removed from one or both of the containment vessels 544a or 544b, a minimum clearance is provided. The height can be selected so that, at the very least, cars or other objects, which are commonly placed under the construction platform, will not be damaged if the containment vessels 544a or 544b are drained.

In one embodiment, the containment vessels 544a or 554b can be joined via conduit 552. Conduit 552 can keep the level of the buffer medium equal in both vessels. When the levels are uneven between the vessels, the construction platforms can tilt. In another embodiment, rather than keeping the levels of the buffer medium in both vessels equal, the buoyancy can be separately adjusted on each side of the construction platform 554 to keep it level.

With respect to FIGS. 14a and 14b, the use of multiple different types of construction platforms with a TPFS including a containment vessel with multiple heights is described. In TPFS configuration 560 in FIG. 14A, a containment vessel with two levels is shown. In particular, the containment vessel includes a first level 580, joined by a slanted portion 582 to a second level 584. The second level 584 joins a slanted sidewall 586 which rises to ground level.

Two construction platforms 566 and 568, which are joined together, are floated in a buffer medium 564. The first construction platform 566 supports building 570 and the second construction platform 568 supports building 572. The construction platform is connected via deck 574. The first construction 566 has a thicker buoyancy layer than the second construction platform 568. Thus, the first construction platform 566 is floated in the deeper portion 580 of the containment vessel. The buoyancy layer of the construction platform 566 may be thicker to support a heavier building.

The two construction platforms, 556 and 568, each include a top layer, which are level with one another as shown in FIG. 14a. The leveling can be accomplished by controlling weight distribution systems in each of the construction platforms, such as a separate ballast system. In other embodiments, the construction platforms can operate at different levels. In this case, the platform 574 can be joined via hinge mechanisms at each platform 566 and 568. When the two constructions are operating at different levels, the platform 574 can be sloped in one direction or the other depending on which of the construction platforms 566 or 568 is higher than the other.

In the TPFS configuration 600 of FIG. 14B, the containment vessel 606 also includes multiple levels, 612a and 612c. The upper level 612a and lower level 612c are joined by a sloped portion 612b. In different embodiments, the slope angle of section 612b can differ. For instance, the section 612b can be a vertical section.

A construction platform 608 is floated in a buffer medium 604. The construction platform supports building 610. The construction platform 608 includes two layers 614a and 614b. The upper layer 614a extends across levels 612a and 612c of the containment vessel 606. The lower layer 614b is only above the lower level of the containment vessel 612c. The lower layer 614b may be provided to provide additional buoyancy such as to support a denser portion of building 610.

An edge 616 of the lower layer 614b is sloped to match the slope of the containment vessel 612b. The edge 616 can be sloped to maintain an equal spacing between the edge 616 and the containment vessel 612b. For earthquake purposes, as described above, a spacing can be selected to be maintained which is above some minimal value so that in an earthquake the side of the containment vessel 612b and the edge 616 don't strike each other with an unacceptable amount of force.

In other embodiments, the slope of edge 616 doesn't have to match the slope of the containment vessel 612b. For example, the slope of edge 616 can be vertical while the slope of section 612b can be the same as shown in FIG. 14B. In this example, the horizontal distance between the edge 616 and the slope 612b can vary from a maximum at the top to a minimum at the bottom. For earthquake purposes, the spacing at the bottom of the edge 616 can be maintained at or above some minimal value.

Figure 15A:
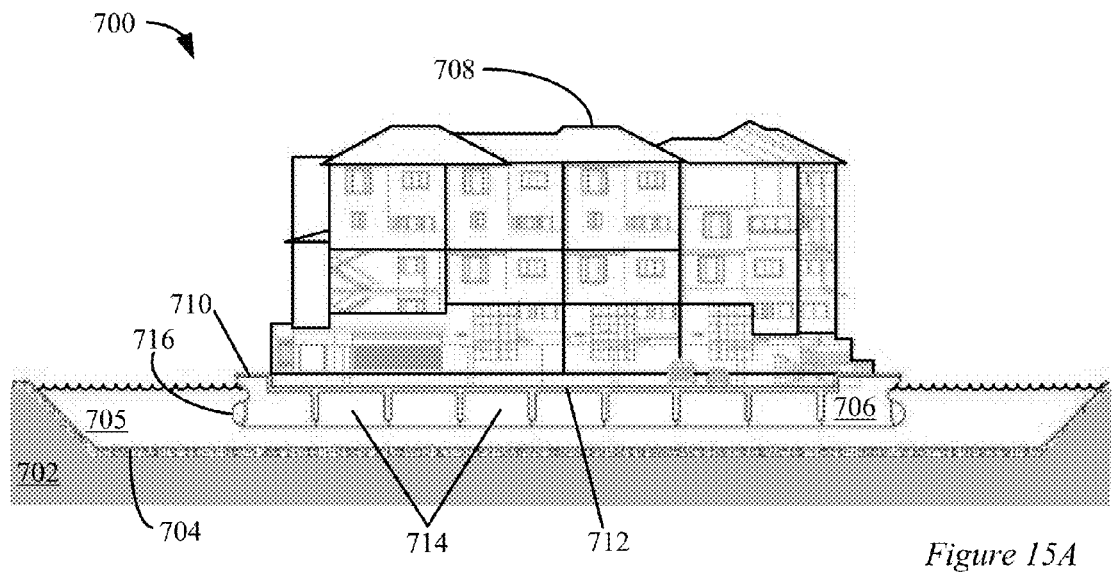
FIGS. 15A, 15B and 15C are section views of a five story building utilizing a three part foundation system with different construction platform designs in accordance with the described embodiments.
Figure 15B:
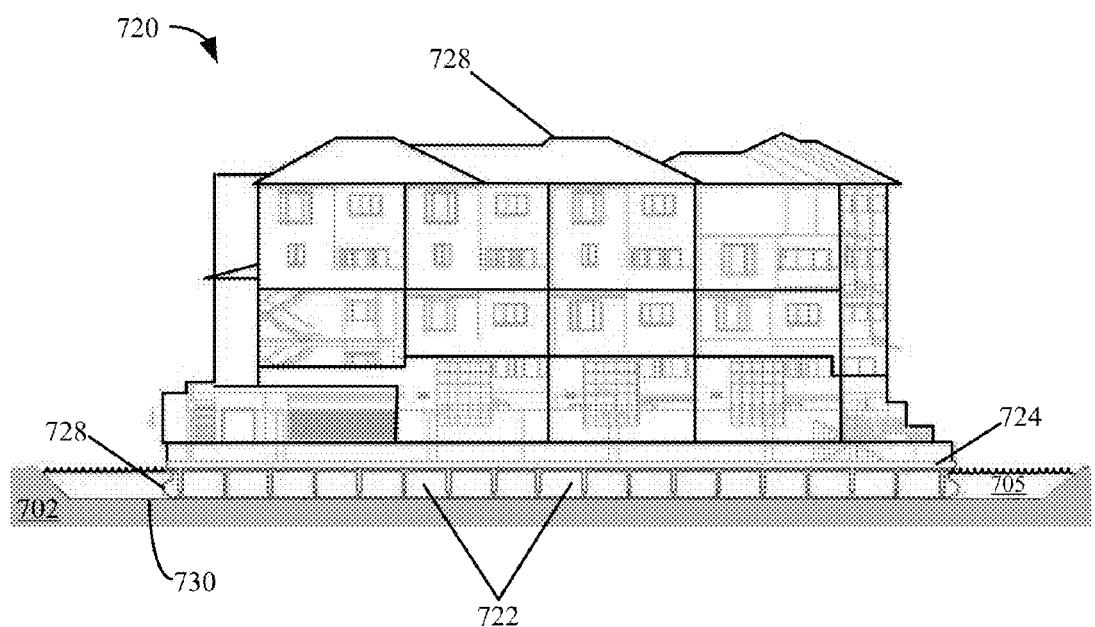
Figure 15C:
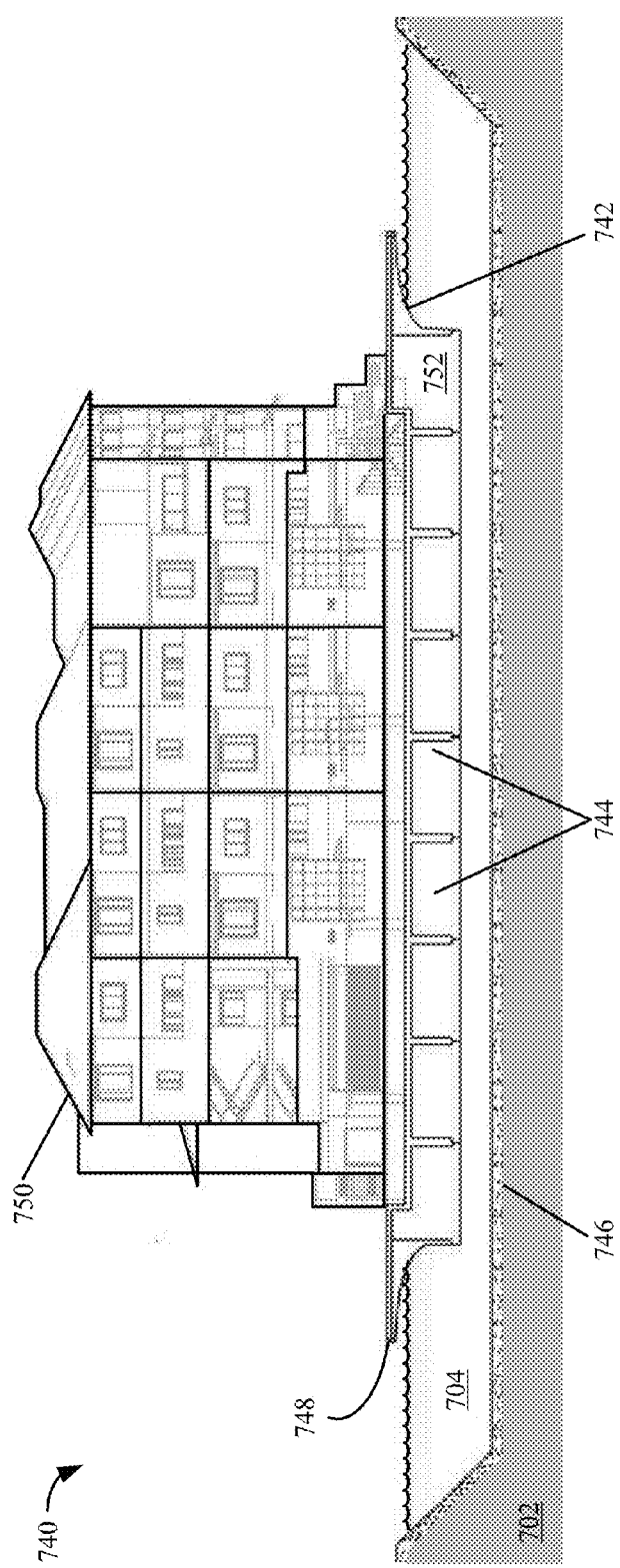

Next with respect to FIGS. 15A, 15B and 15C, three different TPFS designs 700, 720 and 740 are shown. The three designs, 700, 720 and 740, allow for similar buildings 708, 728 and 750 to be floated differently on a buffer medium 705 as compared to one another according to their construction platform design. In 700, 720, and 750, buildings 708, 728 and 750 are five story buildings. Building 708 is built on a TPFS including containment vessel 704, buffer medium 705 and construction platform 706. Building 728 is built on a TPFS including a containment vessel 730, a buffer medium 705 and a construction platform 724. Building 750 is built on a TPFS including a containment vessel 746, a buffer medium 705 and a construction platform 752.

In 700, 720 and 740, the containment vessels are built on a medium 702 and include sloped sides. However, the containment vessels 704 and 746 are deeper than containment vessel 730. The construction platforms 706 and 724 each have curved bows 716 and 728, and are constructed from rectangular blocks 714 and 722, respectively. The platforms, 706 and 724, differ in that platform 706 has two levels 710 and 712 as compared to a single level for platform 724. In addition, platform 706 uses larger and fewer low density blocks, 714, as compared to the low density blocks 722, used for construction platform 724. The larger blocks allow the construction platform 706 to float higher in the water as compared to construction platform 724.

In 740, the building 750 is built on a construction platform 750, floated on a buffer medium 704 above containment vessel 746. The containment vessel 746 is shaped similarly to the other containment vessels in configuration 700 and 720. In 740, the platform 748 includes a portion 748 that extends away from the platform 750 differently than the other two TPFS configurations. In addition, a bow of construction platform 750 is shaped differently as compared to platforms 706 and 724. Platform 750 uses a similar number of low density blocks as compared to platform 700. Thus, both platforms float at a similar height in their respective containment vessels.

Flood Only Configuration and Temporary Buffer Medium Design

Figure 16A:
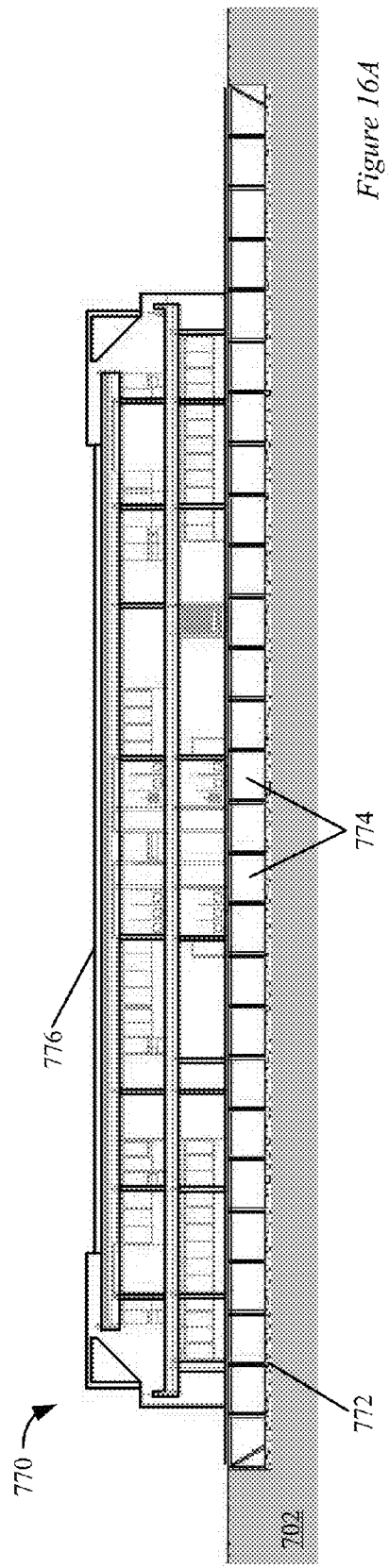

In this section, a TPFS designs, 770 and 780, for mitigating only flood damage are described with respect to FIGS. 16A, 16B and 16C. In addition, one embodiment is described where a temporary buffer medium is used. In FIG. 16A, a building 776 is constructed on top of a TPFS configuration 770. The TPFS is shown in a drained state (no buffer medium is present). The TPFS includes a construction platform 774 and containment vessel 772 built into the ground 702.

The construction platform 774 abuts the sides of the containment vessel 772. In flood conditions, the containment vessel 772 can fill with water which acts as a buffer medium allowing the construction platform to rise up and preventing the building 776 from being damaged. When the flood waters recede, the construction platform can be returned to its initial position. In a flood condition, the sloped sides of the construction platform 774 may allow the platform to center itself as the flood water recedes. As described above, the construction platform 774 can include a number of low density blocks.

In an alternate embodiment, design 770 can be used for earthquake mitigation and flood damage mitigation. In this design, a spacing would be provided between the sides of the containment vessel 772 and the construction platform 774. At most times, the TPFS design 770 can operate in a dry condition with no buffer medium present. When an earthquake is detected, a buffer medium can be provided. As an example, when an earthquake is detected, water tanks can be operated to release water that acts as a buffer medium allowing the construction platform 774 and building 776 to float above the containment vessel during an earthquake.

In another embodiment, the construction platform 774 can be magnetically levitated using principles associated with maglev trains. When an earthquake is detected, a magnetic repulsive force can be generated which can lift the construction platform 774 and building 776. While levitating, the containment vessel 772 can move underneath the building 776 without seismic forces being transferred to the construction platform and the building.

Returning to FIGS. 16B and 16BC, a TPFS design 780 similar to design 770 is shown. In 780, a water conduit system is provided with the containment vessel 772. The water conduit system includes pipes 782a and 782b. The flood water can enter pipes 782a and 782b and then enter the TPFS during flood conditions via an inlet. The capacity of the pipes can be designed to control a rate at which the construction platform rises. The construction platform 774 can include channels, such as 784, that allow the water to penetrate underneath the platform 774. The channels can prevent suction effects from holding down the platform 774 as water rises in the TPFS.

Embodiments of the present invention further relate to computer readable media that include executable program instructions for performing recruiting techniques described herein. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A foundation system for a structure, comprising,
    a containment vessel configured to hold a buffer medium, the containment vessel placed on a ground wherein the buffer medium is a liquid and an additive is mixed with the liquid to change its density; and
    a construction platform formed above the containment vessel wherein the construction platform including the structure is configured to float on the buffer medium;
    wherein the construction platform is positioned relative to sides of the containment vessel such that during an earthquake the containment vessel can move from side to side while the construction platform floats above it allowing seismic forces transferred from the ground to the construction platform to be minimized.

2. The foundation system of claim 1, wherein the structure is a multistory building.

3. The foundation system of claim 1, wherein the buffer medium is water.

4. The foundation system of claim 1, further comprising a sealing mechanism installed between the construction platform and the containment vessel configured to prevent debris from entering into the buffer medium and/or preventing evaporation of the buffer medium.

5. The foundation system of claim 1, wherein the containment vessel is formed using concrete.

6. The system of claim 1, further comprising one or more cantilevered columns wherein the one or more cantilevered columns are integrated into the containment vessel and configured to extend through the construction platform such that the construction platform and the structure can rise during a flood condition relative to a bottom of the containment vessel while its position above the containment vessel is maintained by the one or more cantilevered columns.

7. The foundation system of claim 1, wherein the construction platform is formed from a number of low density blocks and concrete.

8. The foundation system of claim 1, wherein the construction platform is prefabricated as plurality of pieces, said pieces configured to be assembled above the containment vessel.

9. The foundation system of claim 1 further comprising one or more mechanisms for dampening effects of wave action from the buffer medium on the construction platform.

10. The foundation system of claim 1 further comprising one or more non-weight bearing members which secure the construction platform in place, wherein the one or more members are mechanically fused and designed to break when shaking from the earthquake is above a particular magnitude.

11. The foundation system of claim 10 further comprising a weight distribution mechanism used to change a weight distribution of the construction platform such that a pitch of the construction platform is changed.

12. The foundation system of claim 11 wherein the weight distribution mechanism includes one or more ballast tanks which are coupled to a pump wherein the pump allows the one or more ballast tanks to be filled or emptied.

13. The foundation system of claim 1 wherein the buffer medium is water and the additive is salt.

14. The foundation system of claim 1 wherein the buffer medium is contained in a bladder.

15. The foundation system of claim 14 wherein the buffer medium is stored in the bladder in a gaseous state.

16. The foundation system of claim 1, further comprising a mechanism coupled to the construction platform which allows the construction platform to be rotated up to 360 degrees relative to the containment vessel.

17. The foundation system of claim 1, wherein the buffer medium is a solid material with an ability to turn into a liquid or to act as a liquid during an earthquake.

18. A foundation system for a structure, comprising,
    a containment vessel configured to hold a buffer medium, the containment vessel placed on a ground wherein the buffer medium is stored in a bladder;
    a construction platform formed above the containment vessel wherein the construction platform including the structure is configured to float on the buffer medium;
    wherein the construction platform is positioned relative to sides of the containment vessel such that during an earthquake the containment vessel can move from side to side while the construction platform floats above it allowing seismic forces transferred from the ground to the construction platform to be minimized.

19. The foundation system of claim 18 wherein the buffer medium is water.

* * * * *